(12) United States Patent
Lee et al.

(10) Patent No.: US 11,618,804 B2
(45) Date of Patent: Apr. 4, 2023

(54) POLYMER AND POLYMER SEPARATOR COMPRISING SAME

(71) Applicant: LG CHEM, LTD., Seoul (KR)

(72) Inventors: Jinhee Lee, Daejeon (KR); Byungguk Kim, Daejeon (KR); Hyungsam Choi, Daejeon (KR); Yunah Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 162 days.

(21) Appl. No.: 16/754,630

(22) PCT Filed: Nov. 16, 2018

(86) PCT No.: PCT/KR2018/014137
§ 371 (c)(1),
(2) Date: Apr. 8, 2020

(87) PCT Pub. No.: WO2019/098771
PCT Pub. Date: May 23, 2019

(65) Prior Publication Data
US 2020/0354523 A1    Nov. 12, 2020

(30) Foreign Application Priority Data

Nov. 17, 2017    (KR) .......................... 10-2017-0154253

(51) Int. Cl.
*C08G 75/0245*    (2016.01)
*C08G 65/40*    (2006.01)
(Continued)

(52) U.S. Cl.
CPC ......... *C08G 75/0245* (2013.01); *C08G 65/40* (2013.01); *C08G 75/0236* (2013.01);
(Continued)

(58) Field of Classification Search
CPC ................ C08G 65/40; C08G 75/0236; C08G 75/0245; C08G 75/23; C08G 5/22;
(Continued)

(56) References Cited

U.S. PATENT DOCUMENTS

| 10,483,576 | B2 * | 11/2019 | Kim | ...................... H01M 8/188 |
| 10,947,338 | B2 * | 3/2021 | Jang | ........................ C08G 75/06 |
| 2007/0292730 | A1 | 12/2007 | McGrath et al. | |
| 2008/0004360 | A1 | 1/2008 | Yamada et al. | |

(Continued)

FOREIGN PATENT DOCUMENTS

| FR | 3 039 321 A1 | 1/2017 |
| JP | 2010-232159 A | 10/2010 |

(Continued)

OTHER PUBLICATIONS

International Search Report (PCT/ISA/210) issued in PCT/KR2018/014137, dated Feb. 22, 2019.

*Primary Examiner* — Adam A Arciero
(74) *Attorney, Agent, or Firm* — Birch, Stewart, Kolasch & Birch, LLP

(57) ABSTRACT

A polymer including a hydrophilic block and a hydrophobic block, wherein the hydrophilic block includes a unit derived from a compound represented by Chemical Formula 1, and the hydrophobic block includes a unit derived from a fluorine-containing compound, a polymer separator including the same, and a membrane electrode assembly, a fuel cell and a redox flow battery including the same.

12 Claims, 10 Drawing Sheets

(51) Int. Cl.
*C08G 75/0236* (2016.01)
*C08G 75/23* (2006.01)
*C08J 5/22* (2006.01)
*H01M 8/1004* (2016.01)
*H01M 8/1025* (2016.01)
*H01M 8/1032* (2016.01)
*H01M 8/18* (2006.01)

(52) U.S. Cl.
CPC ............... *C08G 75/23* (2013.01); *C08J 5/22* (2013.01); *H01M 8/1004* (2013.01); *H01M 8/1025* (2013.01); *H01M 8/1032* (2013.01); *H01M 8/18* (2013.01)

(58) Field of Classification Search
CPC ............ H01M 8/1004; H01M 8/1025; H01M 8/1032; H01M 8/18; Y02E 60/50
See application file for complete search history.

(56) References Cited

U.S. PATENT DOCUMENTS

| | | |
|---|---|---|
| 2008/0241626 A1 | 10/2008 | Kim et al. |
| 2011/0136040 A1 | 6/2011 | Hwang et al. |
| 2015/0328630 A1 | 11/2015 | Yoo et al. |
| 2017/0087545 A1* | 3/2017 | Yokota .................... C08J 5/2256 |
| 2019/0106530 A1* | 4/2019 | Jang ........................ C08G 75/06 |

FOREIGN PATENT DOCUMENTS

| | | |
|---|---|---|
| JP | 2013-189515 A | 9/2013 |
| KR | 10-2004-0107590 A | 12/2004 |
| KR | 10-2006-0115896 A | 11/2006 |
| KR | 10-2007-0011431 A | 1/2007 |
| KR | 10-2011-0063175 A | 6/2011 |
| KR | 10-2014-0145997 A | 12/2014 |
| KR | 10-2016-0091571 A | 8/2016 |
| KR | 10-2017-0113157 A | 10/2017 |
| WO | WO-2017171290 A1 * | 10/2017 ......... C08G 65/4018 |

* cited by examiner

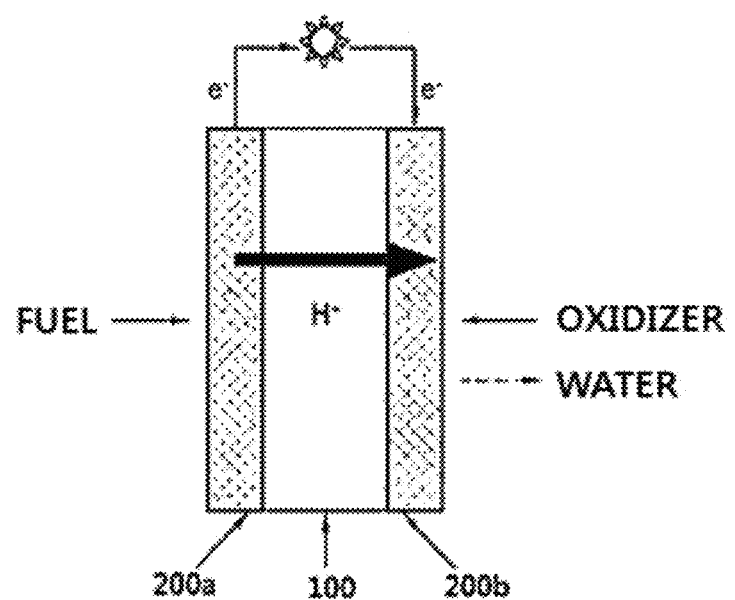
[FIG. 1] - CONVENTIONAL ART

[FIG. 2]
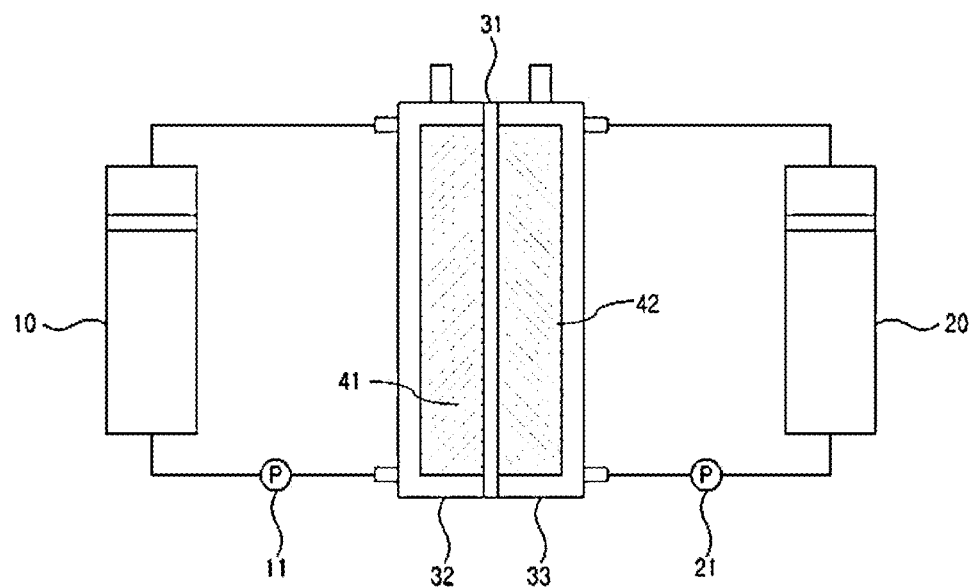
[FIG. 3]
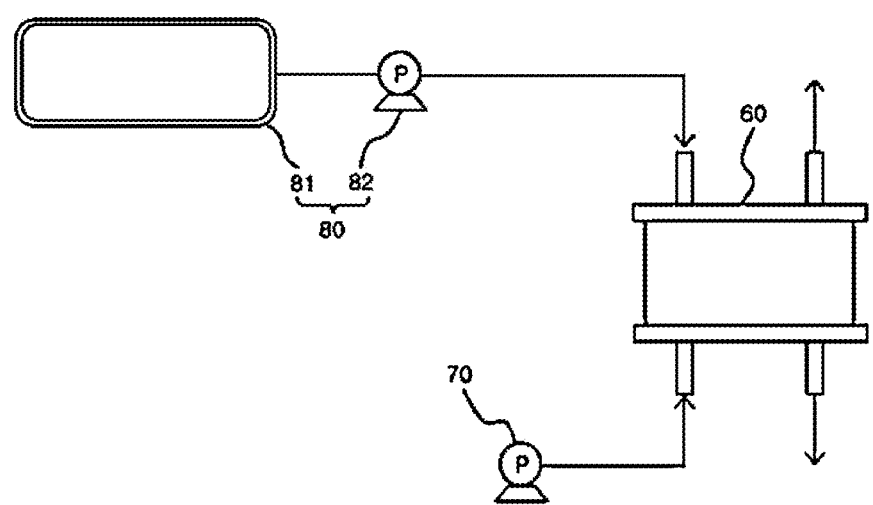

[FIG. 4]
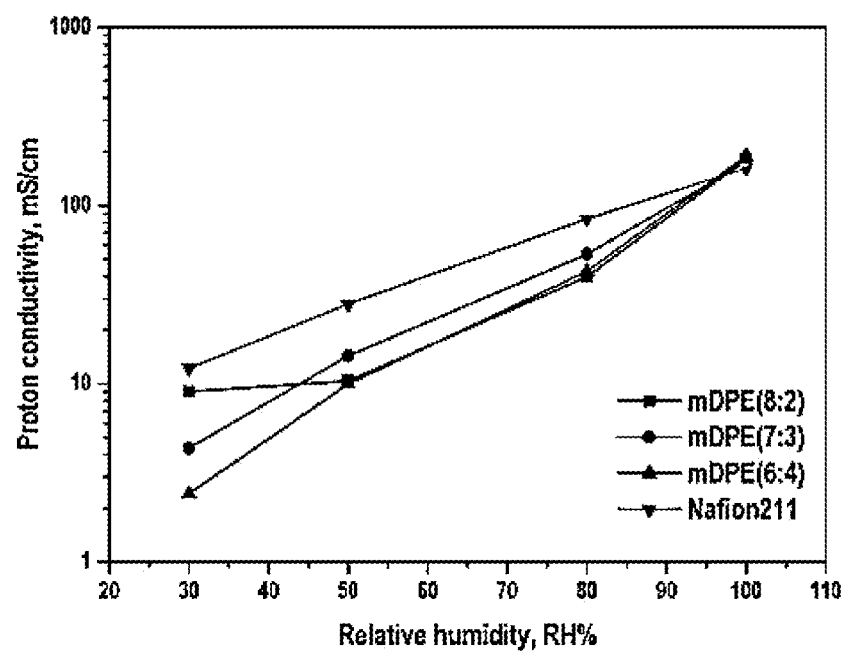

[FIG. 5]
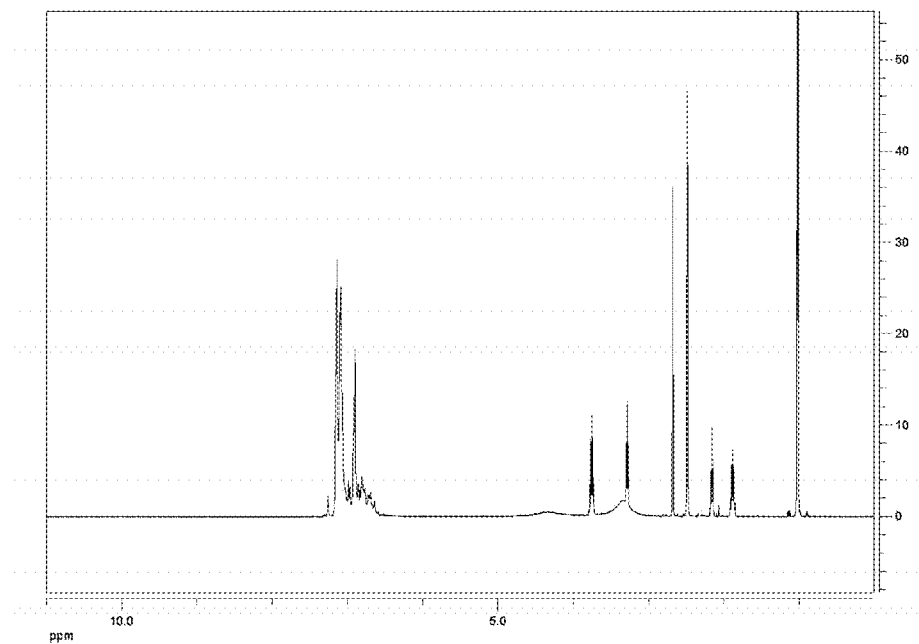

[FIG. 6]
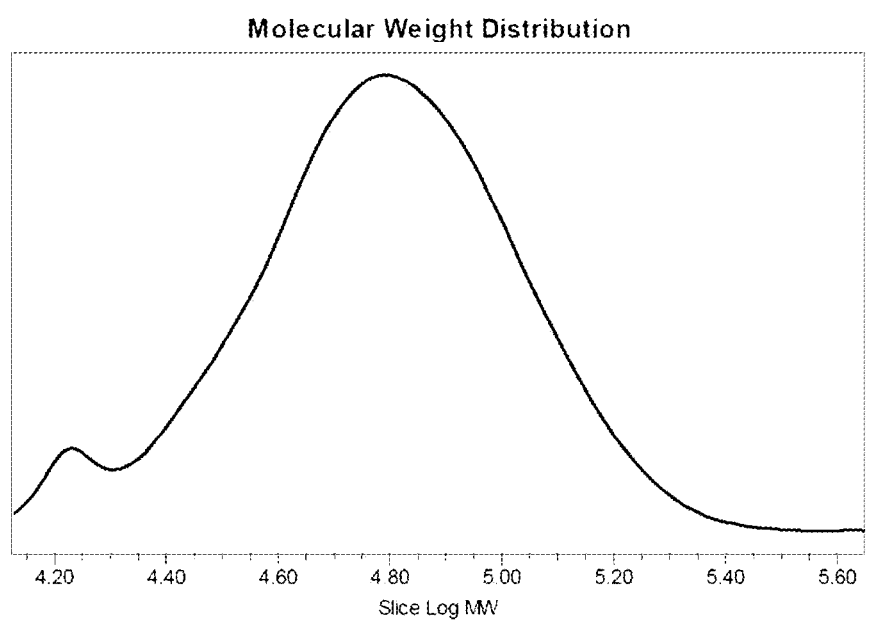

[FIG. 7]
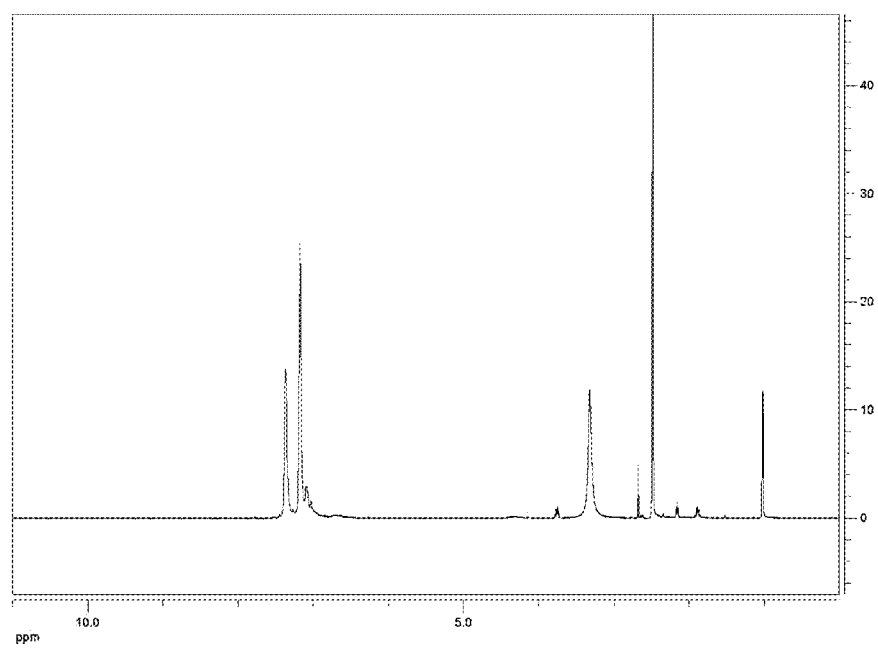

[FIG. 8]
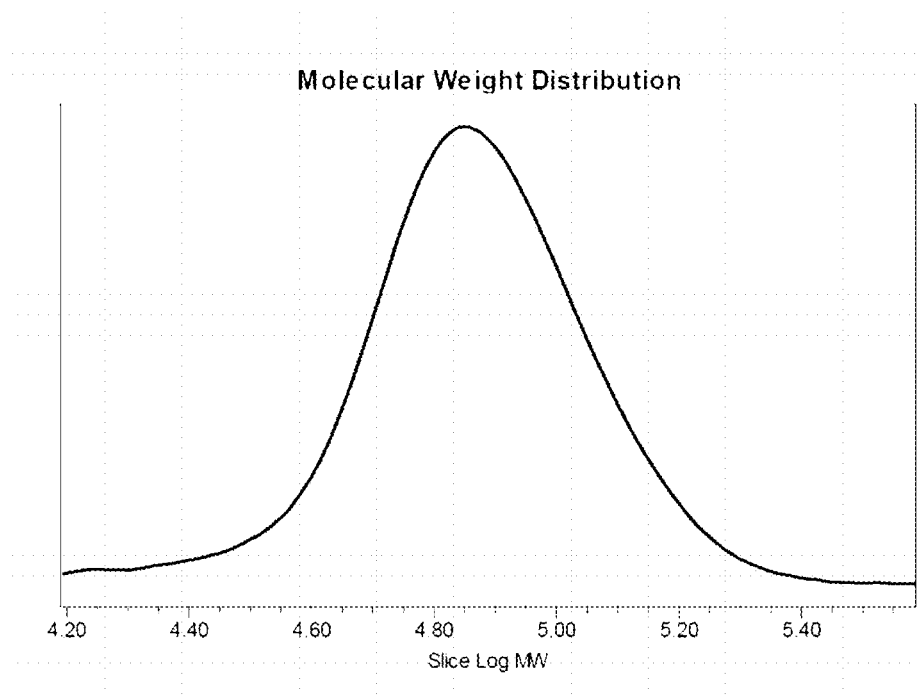
[FIG. 9]
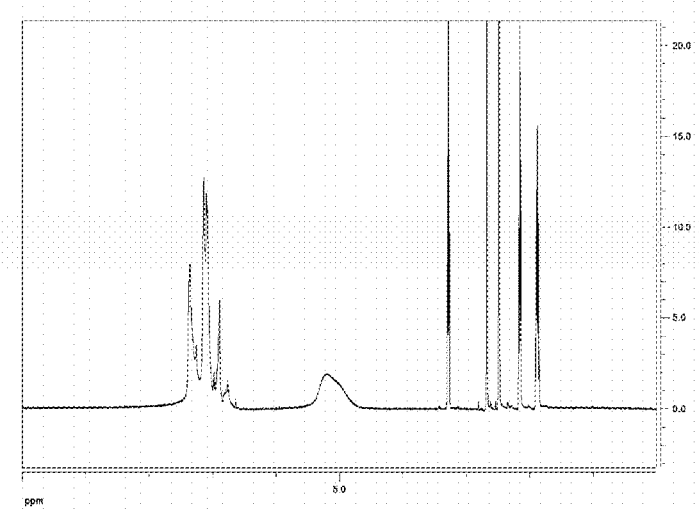

[FIG. 10]
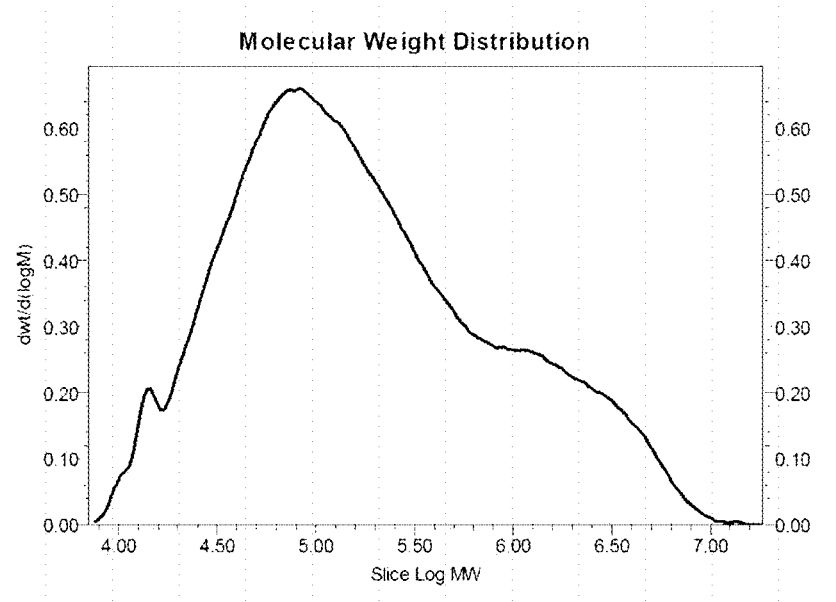
[FIG. 11]
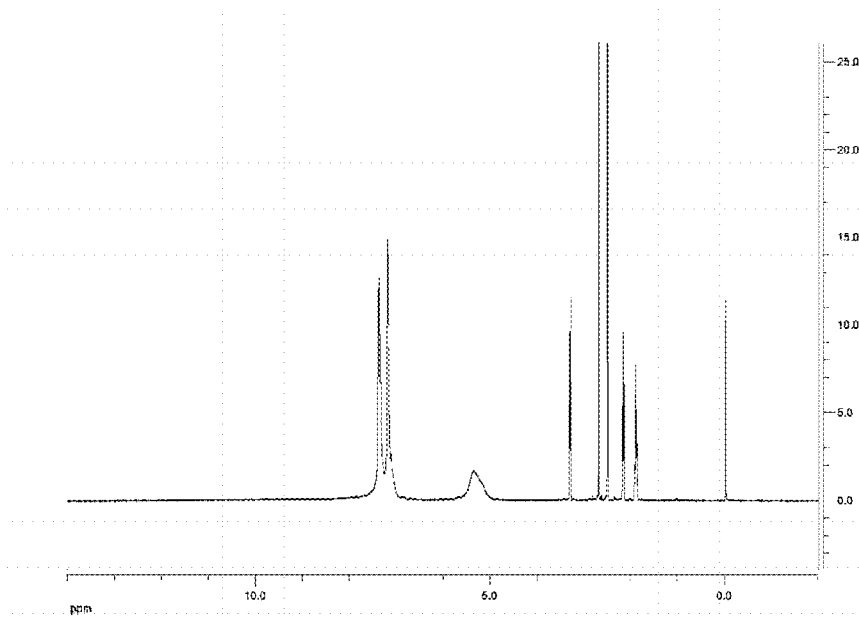

[FIG. 12]
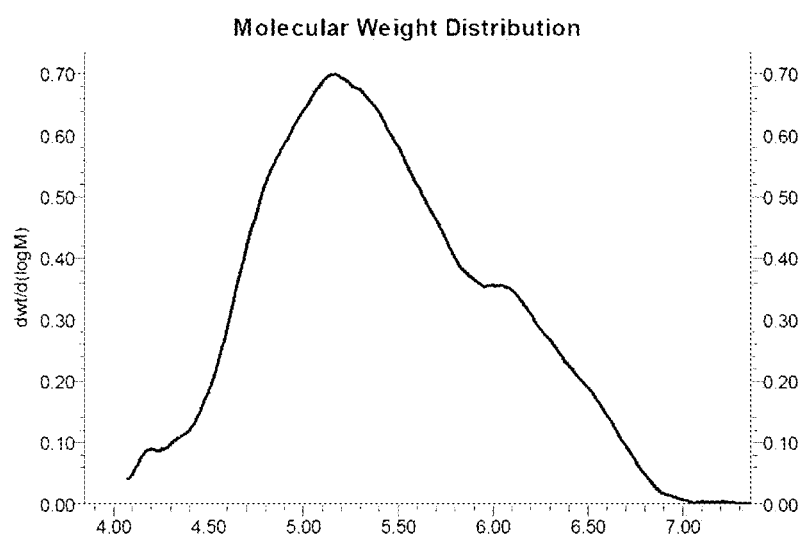
[FIG. 13]
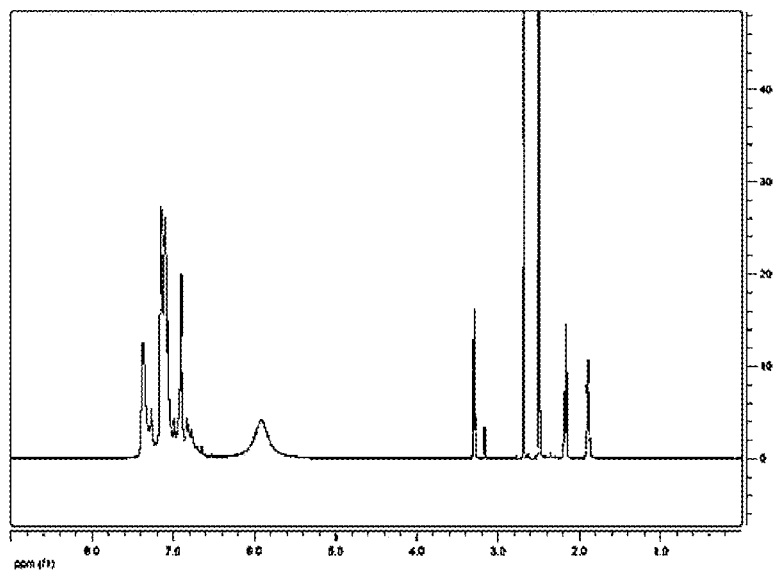

[FIG. 14]
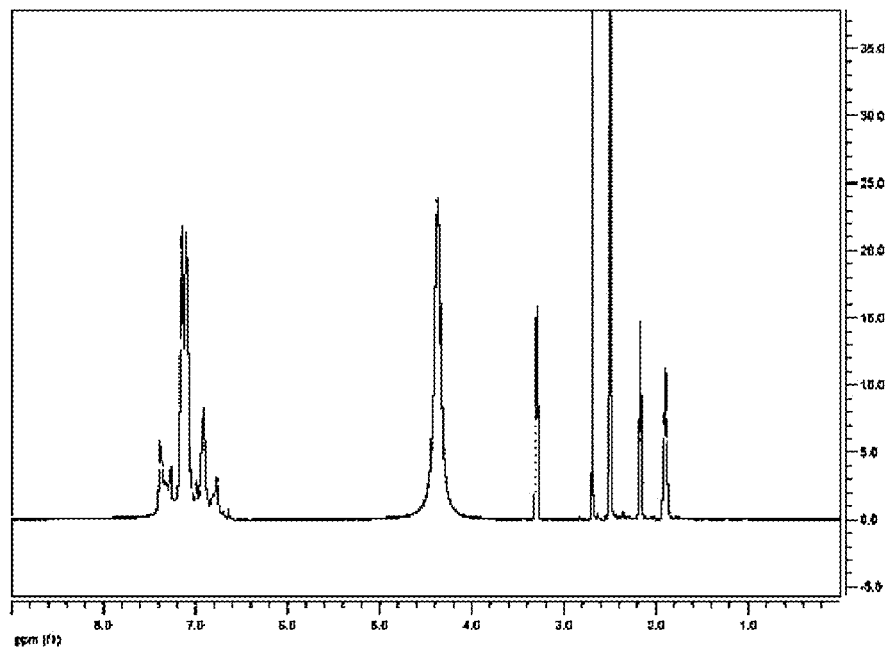

POLYMER AND POLYMER SEPARATOR COMPRISING SAME

TECHNICAL FIELD

The present specification claims priority to and the benefits of Korean Patent Application No. 10-2017-0154253, filed with the Korean Intellectual Property Office on Nov. 17, 2017, the entire contents of which are incorporated herein by reference.

The present specification relates to a polymer, a polymer separator comprising the same, and a membrane electrode assembly, a fuel cell and a redox flow battery comprising the same.

BACKGROUND ART

A separator material for a fuel cell needs to have high ion conductivity, and also needs to have properties such as 1) preventing an electrolyte material crossover, 2) strong chemical resistance when operating the cell, 3) strengthening mechanical properties and 4) a low swelling ratio for preventing a decrease in the cell efficiency when driving. Currently, Nafion is mostly used as a separator material of a fuel cell. Nafion has high ion conductivity and has favorable thermal and mechanical properties, but has disadvantages of being high-priced, having a methanol crossover, and increasing membrane resistance when increasing the thickness to secure mechanical properties. Accordingly, development of materials having both high ion conductivity of Nafion and mechanical properties of hydrocarbon has been required.

DISCLOSURE

Technical Problem

The present specification is directed to providing a polymer, a polymer separator comprising the same, and a membrane electrode assembly, a fuel cell and a redox flow battery comprising the same.

Technical Solution

One embodiment of the present specification provides a polymer comprising a hydrophilic block and a hydrophobic block, wherein the hydrophilic block includes a unit derived from a compound represented by the following Chemical Formula 1, and the hydrophobic block includes a unit derived from a fluorine-containing compound:

[Chemical Formula 1]

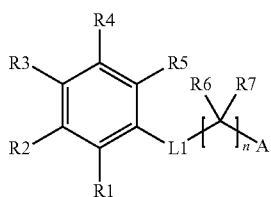

in Chemical Formula 1,

L1 is a direct bond; —S—; —O—; —NRa—; —SO$_2$—; or a substituted or unsubstituted alkylene group having 1 to 10 carbon atoms, A is —SO$_3$H, —SO$_3^-$M$^+$, —COOH, —COO$^-$M$^+$, —PO$_3$H$_2$, —PO$_3$H$^-$M+, —PO$_3^{2-}$2M$^+$, —O(CF$_2$)$_m$SO$_3$H, —O(CF$_2$)$_m$SO$_3$M$^+$, —O(CF$_2$)$_m$COO$^-$H$^+$, —O(CF$_2$)$_m$COO$^-$M$^+$, —O(CF$_2$)$_m$PO$_3$H$_2$, —O(CF$_2$)$_m$PO$_3$H$^-$M$^+$ or —O(CF$_2$)$_m$PO$_3^{2-}$2M$^+$, m is an integer of 2 to 6, and M is a group 1 element, R1 to R5 are the same as or different from each other, and each independently hydrogen; a halogen group; or a hydroxyl group, and at least two of R1 to R5 are a halogen group; or a hydroxyl group, R6 and R7 are the same as or different from each other, and each independently a halogen group, Ra is hydrogen; or a substituted or unsubstituted alkyl group, and n is an integer of 2 to 10, and when n is an integer of 2 or greater, structures in the parentheses are the same as or different from each other.

Another embodiment of the present specification provides a polymer separator comprising the above-described polymer.

Another embodiment of the present specification provides a membrane electrode assembly comprising an anode; a cathode; and the above-described polymer separator provided between the anode and the cathode.

Another embodiment of the present specification provides a polymer electrolyte-type fuel cell comprising two or more of the above-described membrane electrode assemblies; a stack comprising a bipolar plate provided between the membrane electrode assemblies; a fuel supply unit supplying a fuel to the stack; and an oxidizer supply unit supplying an oxidizer to the stack.

Lastly, another embodiment of the present specification provides a redox flow battery comprising a positive electrode cell comprising a positive electrode and a positive electrode electrolyte liquid; a negative electrode cell comprising a negative electrode and a negative electrode electrolyte liquid; and the polymer separator of one embodiment described above provided between the positive electrode cell and the negative electrode cell.

Advantageous Effects

A polymer separator according to one embodiment of the present specification is capable of accomplishing high ion conductivity by a hydrophilic block including perfluorosulfonic acid, and is capable of increasing mechanical stability of the separator under a humidity condition by a large amount of fluorine functional groups included in a hydrophobic block lowering water uptake.

In addition, the polymer separator according to one embodiment of the present specification has a low swelling ratio, and is capable of maintaining excellent ion conductivity even under a low humidity condition.

DESCRIPTION OF DRAWINGS

FIG. 1 is a schematic diagram showing a principle of electricity generation of a fuel cell.

FIG. 2 is a diagram schematically illustrating one embodiment of a redox flow battery.

FIG. 3 is a diagram schematically illustrating one embodiment of a fuel cell.

FIG. 4 is a graph presenting cation conductivity values according to Examples 1, 3 and 4, and Comparative Example.

FIG. 5 is a diagram presenting a $^1$H-NMR spectrum of Hydrophilic Polymer A prepared according to Preparation Example 1.

FIG. 6 is a diagram presenting molecular weight distribution of Hydrophilic Polymer A prepared according to Preparation Example 1 measured using a GPC trace.

FIG. 7 is a diagram presenting a $^1$H-NMR spectrum of Hydrophilic Polymer B prepared according to Preparation Example 2.

FIG. 8 is a diagram presenting molecular weight distribution of Hydrophilic Polymer B prepared according to Preparation Example 2 measured using a GPC trace.

FIG. 9 is a diagram presenting a $^1$H-NMR spectrum of Block Polymer I synthesized according to Example 1.

FIG. 10 is a diagram presenting molecular weight distribution of Block Polymer I synthesized according to Example 1 measured using a GPC trace.

FIG. 11 is a diagram presenting a $^1$H-NMR spectrum of Block Polymer II synthesized according to Example 2.

FIG. 12 is a diagram presenting molecular weight distribution of Block Polymer II synthesized according to Example 2 measured using a GPC trace.

FIG. 13 is a diagram presenting a $^1$H-NMR spectrum of Block Polymer III synthesized according to Example 3.

FIG. 14 is a diagram presenting a $^1$H-NMR spectrum of Block Polymer IV synthesized according to Example 4.

MODE FOR DISCLOSURE

Hereinafter, the present specification will be described in more detail.

One embodiment of the present specification provides a polymer comprising a hydrophilic block and a hydrophobic block, wherein the hydrophilic block includes a unit derived from a compound represented by the following Chemical Formula 1, and the hydrophobic block includes a unit derived from a fluorine-containing compound.

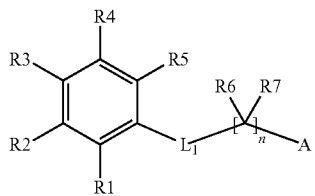

[Chemical Formula 1]

In Chemical Formula 1,

L1 is a direct bond; —S—; —O—; —NRa—; —SO$_2$—; or a substituted or unsubstituted alkylene group having 1 to 10 carbon atoms, A is —SO$_3$H, —SO$_3^-$M$^+$, —COOH, —COO$^-$M+, —PO$_3$H$_2$, —PO$_3$H M+, —PO$_3^{2-}$2M$^+$, —O(CF$_2$)$_m$SO$_3$H, —O(CF$_2$)$_m$SO$_3^-$M$^+$, —O(CF$_2$)$_m$COOH, —O(CF$_2$)$_m$COO$^-$M$^+$, —O(CF$_2$)$_m$PO$_3$H$_2$, —O(CF$_2$)$_m$PO$_3$H$^-$M$^+$ or —O(CF$_2$)$_m$PO$_3^{2-}$2M$^+$, m is an integer of 2 to 6, and M is a group 1 element, R1 to R5 are the same as or different from each other, and each independently hydrogen; a halogen group; or a hydroxyl group, and at least two of R1 to R5 are a halogen group; or a hydroxyl group, R6 and R7 are the same as or different from each other, and each independently a halogen group, Ra is hydrogen; or a substituted or unsubstituted alkyl group, and n is an integer of 2 to 10, and when n is an integer of 2 or greater, structures in the parentheses are the same as or different from each other.

Nafion that has been used as a material of a separator in the art has high ion conductivity and has favorable thermal and mechanical properties, but has disadvantages of being high-priced, having a methanol crossover, and increasing membrane resistance when increasing the thickness to secure mechanical properties. A hydrocarbon-based separator material developed to replace this has an advantage of being prepared to a thin membrane by having high mechanical strength and thermal stability, but has a disadvantage of decreasing membrane stability under a humidity condition since a number of acid functional groups need to be introduced to have high ion conductivity.

Accordingly, the polymer according to one embodiment of the present specification introduces a block copolymer concept to increase ion conductivity and maintain mechanical properties, and transfers ions through a hydrophilic block and secures mechanical properties through a hydrophobic block, and, through introducing perfluorosulfonic acid (ex, —CF$_2$CF$_2$SO$_3$H), a super acid, instead of sulfuric acid (—SO$_3$H) generally introduced to a hydrocarbon-based polymer, provides high ion conductivity.

In addition, the polymer synthesized according to one embodiment of the present specification exhibits favorable solubility for an aprotic polar solvent, and is dissolved in dimethyl sulfoxide (DMSO) and casted to secure a brown transparent separator. The prepared separator has a low swelling ratio, and exhibits results close to Nafion under a low humidity condition.

In addition, the polymer according to one embodiment of the present specification may be polymerized at a low temperature of a 40° C. to 90° C. range, and side reactions such as an ether-ether interchange reaction may be suppressed. As a result, gelation caused by high reactivity of a fluorine-containing compound that becomes a unit included in the hydrophobic block may be prevented, and a multi-block polymer in which hydrophilic block and hydrophobic block structures are strictly controlled.

The unit derived from the compound represented by Chemical Formula 1 according to one embodiment of the present specification has high reactivity in a polymerization process, and may increase process efficiency. In addition, a polymer separator prepared using the unit derived from the compound may readily form a hydrophilic-hydrophobic phase separation structure. In addition, by the polymer separator including the unit derived from the compound according to one embodiment of the present specification controlling the phase separation structure, a hydrophilic channel may be efficiently formed in the polymer separator. The polymer separator including the unit derived from the compound also has excellent ion conductivity. In addition, the unit derived from the compound is thermally and chemically stable.

The polymer separator including the unit derived from the compound according to one embodiment of the present specification may have equal ion conductivity at low ion exchange capacity (IEC) compared to a polymer separator including a hydrocarbon-based compound, and therefore, is capable of maintaining excellent ion conductivity while having small water uptake.

In addition, a polymer electrolyte-type fuel cell (PEMFC) comprising the polymer separator according to one embodiment of the present specification may prevent a gas crossover, and may enhance ion conductivity even under a low humidity condition.

A redox flow battery comprising the polymer separator according to one embodiment of the present specification may prevent a vanadium ion crossover.

A fuel cell comprising the polymer separator according to one embodiment of the present specification has excellent durability and efficiency.

In the present specification, a description of a certain part "comprising" certain constituents means capable of further including other constituents, and does not exclude other constituents unless particularly stated on the contrary.

In the present specification, "derived" means producing new bonds as bonds of a compound are cut or substituents fall off, and the unit derived from the compound may mean a unit linked to a main chain of a polymer. The unit may form a polymer by being included in a main chain in the polymer.

In the present specification, the "unit" is a structure of a monomer included and repeated in a polymer, and means a structure of a monomer being bonded in a polymer through polymerization.

In the present specification, the meaning of "including a unit" means being included in a main chain in a polymer.

In the present specification, the "separator" is a membrane capable of exchanging ions, and comprises a membrane, an ion exchange membrane, an ion transfer membrane, an ion conducting membrane, an ion exchange separator, an ion transfer separator, an ion conducting separator, an ion exchange electrolyte membrane, an ion transfer electrolyte membrane, an ion conducting electrolyte membrane or the like.

In the present specification, the term "substituted or unsubstituted" means being substituted with one or more substituents selected from the group consisting of deuterium; a halogen group; a cyano group; a nitro group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted silyl group; a substituted or unsubstituted amine group; a substituted or unsubstituted aryl group; and a substituted or unsubstituted heteroaryl group, or being substituted with a substituent linking two or more substituents among the substituents illustrated above, or having no substituents. For example, "a substituent linking two or more substituents" may include an alkyl group substituted with a halogen group, an aryl group substituted with an alkyl group, an aryl group substituted with an aryl group, an aryl group substituted with a heteroaryl group, an aryl group substituted with a silyl group, a silyl group substituted with an alkyl group, a heteroaryl group substituted with an alkyl group, a heteroaryl group substituted with an aryl group, a heteroaryl group substituted with a heteroaryl group, and the like, but is not limited thereto.

In the present specification, the term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

In the present specification, the "hydrocarbon-based" means an organic compound formed only with carbon and hydrogen, and includes, but is not limited to, linear, branched, cyclic hydrocarbon and the like. In addition, a single bond, a double bond or a triple bond may be included, however, the hydrocarbon-based is not limited thereto.

In the present specification, the "fluorine-based assembly" means a part or all of carbon-hydrogen bonds in the hydrocarbon-based being substituted with fluorine.

In the present specification, the "hydrophilic block" means a block having an ion exchange group as a functional group. Herein, the functional group may be at least any one selected from the group consisting of $-SO_3H$, $-SO_3^-M^+$, $-COOH$, $-COO^-M^+$, $-PO_3H_2$, $-PO_3H^-M^+$, $-PO_3^{2-}2M^+$, $-O(CF_2)_wSO_3H$, $-O(CF_2)_wSO_3^-M^+$, $-O(CF_2)_wCOOH$, $-O(CF_2)_wCOO^-M^+$, $-O(CF_2)_wPO_3H_2$, $-O(CF_2)_wPO_3H^-M^+$ and $-O(CF_2)_wPO_3^{2-}2M^+$. Herein, M is a metallic element, and w may have a range of $1<w<10$. In other words, the functional group may be hydrophilic.

In the present specification, the "block having an ion exchange group" means a block including an average of 0.5 or more ion exchange groups when representing as the number of ion exchange groups per one structure monomer forming the corresponding block, and having an average of 1.0 or more ion exchange groups per one structure monomer is more preferred.

In the present specification, the "hydrophobic block" means the polymer block that does not substantially have an ion exchange group.

In the present specification, the "block that does not substantially have an ion exchange group" means a block including an average of less than 0.1 ion exchange groups when representing as the number of ion exchange groups per one structure monomer forming the corresponding block, and having an average of 0.05 or less is more preferred, and a block that does not have an ion exchange group at all is even more preferred.

In the present specification, the halogen group may be F, Cl, Br, I or the like.

In the present specification, the alkyl group may be linear or branched, and although not particularly limited thereto, the number of carbon atoms is preferably from 1 to 50. According to one embodiment, the number of carbon atoms of the alkyl group is from 1 to 20. According to another embodiment, the number of carbon atoms of the alkyl group is from 1 to 10. According to another embodiment, the number of carbon atoms of the alkyl group is from 1 to 6. Specific examples of the alkyl group may include methyl, ethyl, propyl, n-propyl, isopropyl, butyl, n-butyl, isobutyl, tert-butyl, sec-butyl, 1-methylbutyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethylpropyl, 1,1-dimethylpropyl, isohexyl, 4-methylhexyl, 5-methylhexyl and the like, but are not limited thereto.

In the present specification, the cycloalkyl group is not particularly limited, but preferably has 3 to 50 carbon atoms, and according to one embodiment, the number of carbon atoms of the cycloalkyl group is from 3 to 30. According to another embodiment, the number of carbon atoms of the cycloalkyl group is from 3 to 20. According to another embodiment, the number of carbon atoms of the cycloalkyl group is from 3 to 6. Specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the aryl group is not particularly limited, but may have 6 to 50 carbon atoms, and the aryl group may be a monocyclic aryl group or a polycyclic aryl group. According to one embodiment, the number of carbon atoms of the aryl group is from 6 to 30. According to one embodiment, the number of carbon atoms of the aryl group is from 6 to 20. Examples of the monocyclic aryl group may include a phenyl group, a biphenyl group, a terphenyl group and the like, but are not limited thereto. Examples of the polycyclic aryl group may include a naphthyl group, an anthracenyl group, a phenanthrenyl group, a pyrenyl group, a perylenyl group, a fluoranthenyl group, a triphenylenyl group, a phenalenyl group, a chrysenyl group, a fluorenyl group, a benzofluorenyl group, a spirobifluorenyl group, a triphenylene group, a spirobenzoanthracenefluorenyl group and the like, but are not limited thereto.

In the present specification, the heteroaryl group is a group including one or more atoms that are not carbon, that is, heteroatoms, and specifically, the heteroatom may include one or more atoms selected from the group consisting of N, P, O, S, Se, Ge, Si and the like. Although not particularly limited thereto, the number of carbon atoms is preferably from 2 to 50, and according to one embodiment, the number of carbon atoms of the heteroaryl group is from 2 to 30. According to another embodiment, the number of carbon atoms of the heteroaryl group is from 2 to 20. The heteroaryl group may be monocyclic or polycyclic. Examples of the heteroaryl group may include a thiophene group, a furanyl group, a pyrrole group, an imidazolyl group, a triazolyl group, an oxazolyl group, an isoxazolyl group, an oxadiazolyl group, a pyridyl group, a bipyridyl group, a pyrimidyl group, a triazinyl group, a triazolyl group, an acridyl group, a pyridazinyl group, a pyrazinyl group, a quinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a dibenzofuranyl group, a naphthobenzofuranyl group, a phenanthroline group, a thiadiazolyl group, a phenothiazinyl group, an acenaphthoquinoxalyl group, an indenoquinazolyl group, an indenoisoquinolyl group, an indenoquinolyl group, a pteridinyl group, a phenoxazinyl group, a benzoquinazolyl group, an indazolyl group, a benzopyrimidinolyl group, a benzopyrimidinyl group, a spiroacridinefluorenyl group and the like, but are not limited thereto.

In the present specification, the alkoxy group may be linear, branched or cyclic. The number of carbon atoms of the alkoxy group is not particularly limited, but is preferably from 1 to 50. Specific examples thereof may include methoxy, ethoxy, n-propoxy, isopropoxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy and the like, but are not limited thereto.

In the present specification, the alkenyl group may be linear or branched, and although not particularly limited thereto, the number of carbon atoms is preferably from 2 to 50. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, specific examples of the silyl group may include a trimethylsilyl group, a triethylsilyl group, a tert-butyldimethylsilyl group, a vinyldimethylsilyl group, a propyldimethylsilyl group, a triphenylsilyl group, a diphenylsilyl group, a phenylsilyl group and the like, but are not limited thereto.

In the present specification, the amine group may be selected from the group consisting of —$NH_2$; an alkylamine group; an N-alkylarylamine group; an arylamine group; an N-arylheteroarylamine group; an N-alkylheteroarylamine group and a heteroarylamine group, and although not particularly limited thereto, the number of carbon atoms is preferably from 1 to 50. Specific examples of the amine group may include a methylamine group, a dimethylamine group, an ethylamine group, a diethylamine group, a phenylamine group, a naphthylamine group, a biphenylamine group, an anthracenylamine group, a 9-methylanthracenylamine group, a diphenylamine group, an N-phenylnaphthylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenyl amine group, an N-phenylfluorenylamine group, an N-phenylterphenylamine group, an N-phenanthrenylfluorenylamine group, an N-biphenylfluorenylamine group and the like, but are not limited thereto.

According to one embodiment of the present specification, the hydrophilic block of the polymer comprised in the polymer separator includes a unit derived from the compound represented by Chemical Formula 1.

According to one embodiment of the present specification, R1 to R5 are the same as or different from each other, and each independently hydrogen or a halogen group.

According to one embodiment of the present specification, at least two of R1 to R5 are a halogen group.

According to one embodiment of the present specification, R1 to R5 are the same as or different from each other, and each independently hydrogen or F.

According to one embodiment of the present specification, at least two of R1 to R5 are F.

According to one embodiment of the present specification, at least two of R1 to R5 are F, and the rest are hydrogen.

According to one embodiment of the present specification, R2 and R4 are F, and R1, R3 and R5 are hydrogen.

According to one embodiment of the present specification, R1 and R3 are F, and R2, R4 and R5 are hydrogen.

According to one embodiment of the present specification, R2 and R5 are F, and R1, R3 and R4 are hydrogen.

According to one embodiment of the present specification, L1 is a direct bond; —S—; —O—; —NRa—; —$SO_2$—; or an alkylene group having 1 to 10 carbon atoms unsubstituted or substituted with a halogen group.

According to one embodiment of the present specification, L1 is a direct bond; —S—; —O—; —NRa—; —$SO_2$—; or an alkylene group having 1 to 6 carbon atoms unsubstituted or substituted with a halogen group.

According to one embodiment of the present specification, L1 is a direct bond.

According to one embodiment of the present specification, L1 is —S—.

According to one embodiment of the present specification, L1 is —O—.

According to one embodiment of the present specification, L1 is —NRa—.

According to one embodiment of the present specification, L1 is —$SO_2$—.

According to one embodiment of the present specification, L1 is —CF$_2$CF$_2$—.

According to one embodiment of the present specification, A is —SO$_3$H, —SO$_3$$^-$M$^+$, —O(CF$_2$)$_m$SO$_3$H or —O(CF$_2$)$_m$SO$_3$$^-$M$^+$.

According to one embodiment of the present specification, A is —SO$_3$H or —SO$_3$$^-$M$^+$.

According to one embodiment of the present specification, A is —O(CF$_2$)$_m$SO$_3$H or —O(CF$_2$)$_m$SO$_3$$^-$M$^+$.

According to one embodiment of the present specification, when A is —SO$_3$H, —SO$_3$$^-$H$^+$, —O(CF$_2$)$_n$SO$_3$H or —O(CF$_2$)$_m$SO$_3$$^-$M$^+$, the polymer including the unit derived from the compound represented by Chemical Formula 1 may be chemically stably formed.

According to one embodiment of the present specification, M is a group 1 element.

According to one embodiment of the present specification, the group 1 element is Li, Na or K.

According to one embodiment of the present specification, R6 and R7 are F.

According to one embodiment of the present specification, Chemical Formula 1 may be represented by one selected from among the following Chemical Formulae 1-1 to 1-6.

[Chemical Formula 1-1]

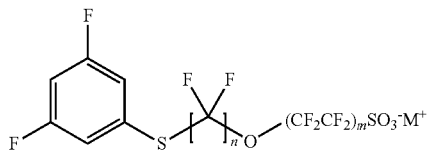

[Chemical Formula 1-2]

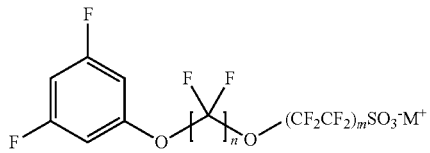

[Chemical Formula 1-3]

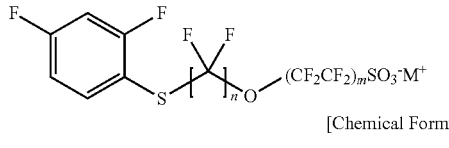

[Chemical Formula 1-4]

[Chemical Formula 1-5]

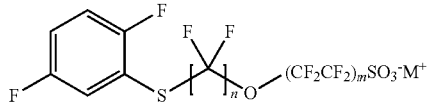

[Chemical Formula 1-6]

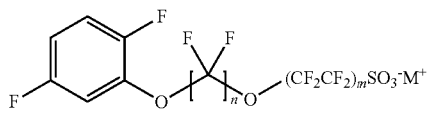

In Chemical Formulae 1-1 to 1-6, n, m and M have the same definitions as in Chemical Formula 1.

According to one embodiment of the present specification, n is 2.

According to one embodiment of the present specification, m is 2.

According to one embodiment of the present specification, the hydrophilic block of the polymer comprised in the polymer separator may further include a unit derived from a compound represented by the following Chemical Formula 2.

[Chemical Formula 2]

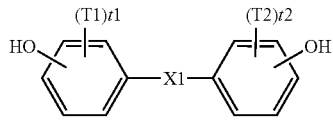

In Chemical Formula 2,

X1 is a direct bond; —C(Z1)(Z2)-; —O—; —S—; —SO$_2$—; —CO—; or —Si(Z1)(Z2)-,

Z1 and Z2 are the same as or different from each other, and each independently hydrogen; deuterium; a halogen group; a substituted or unsubstituted alkyl group; or a substituted or unsubstituted aryl group, and T1 and T2 are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted amine group; a substituted or unsubstituted aryl group; or a substituted or unsubstituted heteroaryl group, t1 and t2 are an integer of 0 to 4, and when t1 and t2 are an integer of 2 or greater, substituents in the parentheses are the same as or different from each other.

According to one embodiment of the present specification, X1 is a direct bond.

According to one embodiment of the present specification, X1 is —C(Z1)(Z2)-.

According to one embodiment of the present specification, X1 is —O—.

According to one embodiment of the present specification, X1 is —S—.

According to one embodiment of the present specification, X1 is —SO$_2$.

According to one embodiment of the present specification, X1 is —CO—.

According to one embodiment of the present specification, X1 is —Si(Z1)(Z2)-.

According to one embodiment of the present specification, Z1 and Z2 are the same as or different from each other, and each independently hydrogen; deuterium; a halogen group; a substituted or unsubstituted alkyl group having 1 to 10 carbon atoms; or a substituted or unsubstituted aryl group having 6 to 10 carbon atoms.

According to one embodiment of the present specification, Z1 and Z2 are the same as or different from each other, and each independently a halogen group; or an alkyl group having 1 to 10 carbon atoms unsubstituted or substituted with a halogen group.

According to one embodiment of the present specification, Z1 and Z2 are the same as or different from each other, and each independently an alkyl group having 1 to 10 carbon atoms unsubstituted or substituted with a halogen group.

According to one embodiment of the present specification, Z1 and Z2 are the same as or different from each other, and each independently an alkyl group having 1 to 10 carbon atoms unsubstituted or substituted with F.

According to one embodiment of the present specification, Z1 and Z2 are a methyl group substituted with F.

According to one embodiment of the present specification, Z1 and Z2 are —CF$_3$.

According to one embodiment of the present specification, T1 and T2 are the same as or different from each other, and each independently hydrogen; or a halogen group.

According to one embodiment of the present specification, T1 and T2 are the same as or different from each other, and each independently hydrogen.

According to one embodiment of the present specification, the hydrophilic block may include a repeating unit represented by the following Chemical Formula 4.

[Chemical Formula 4]

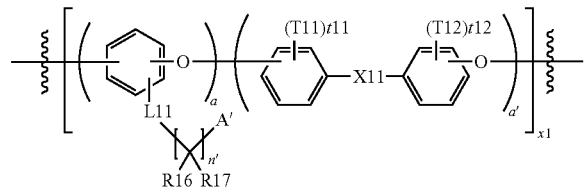

In Chemical Formula 4, x1, a and a' are, as a repetition number of units in the parentheses, an integer of 1 to 1,000, and a:a' is from 1,000:1 to 1:1,000, L11 is a direct bond; —S—; —O—; —NRb—; —SO$_2$—; or a substituted or unsubstituted alkylene group having 1 to 10 carbon atoms, A' is —SO$_3$H, —SO$_3^-$M$^+$, —COOH, —COO$^-$M$^+$, —PO$_3$H$_2$, —PO$_3$H$^-$M$^+$, —PO$_3^{2-}$2M$^+$, —O(CF$_2$)$_m$SO$_3$H, —O(CF$_2$)$_m$SO$_3$M+, —O(CF$_2$)$_m$COOH, —O(CF$_2$)$_m$COO$^-$M$^+$, —O(CF$_2$)$_m$PO$_3$H$_2$, —O(CF$_2$)$_m$PO$_3$H$^-$M$^+$ or —O(CF$_2$)$_m$PO$_3^{2-}$2M$^+$, m is an integer of 2 to 6, and M is a group 1 element, R16 and R17 are the same as or different from each other, and each independently a halogen group, Rb is hydrogen; or a substituted or unsubstituted alkyl group, n' is an integer of 2 to 10, and when n' is an integer of 2 or greater, structures in the parentheses are the same as or different from each other, X11 is a direct bond; —C(Z11)(Z12)-; —O—; —S—; —SO$_2$—; —CO—; or —Si(Z11)(Z12)-, Z11 and Z12 are the same as or different from each other, and each independently hydrogen; deuterium; a halogen group; a substituted or unsubstituted alkyl group; or a substituted or unsubstituted aryl group, and T11 and T12 are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted amine group; a substituted or unsubstituted aryl group; or a substituted or unsubstituted heteroaryl group, t11 and t12 are an integer of 0 to 4, and when t11 and t12 are an integer of 2 or greater, substituents in the parentheses are the same as or different from each other.

According to one embodiment of the present specification, Chemical Formula 4 may be represented by one selected from among the following Chemical Formulae 4-1 to 4-3.

[Chemical Formula 4-1]

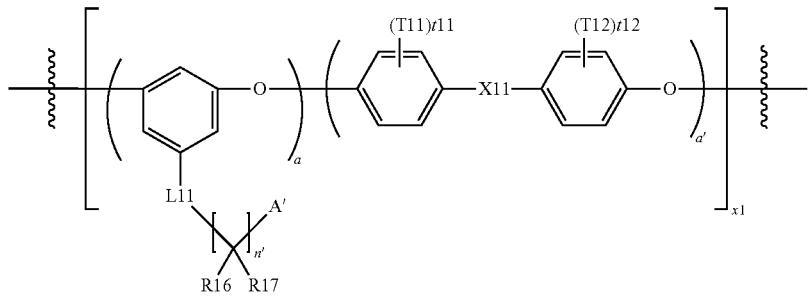

[Chemical Formula 4-2]

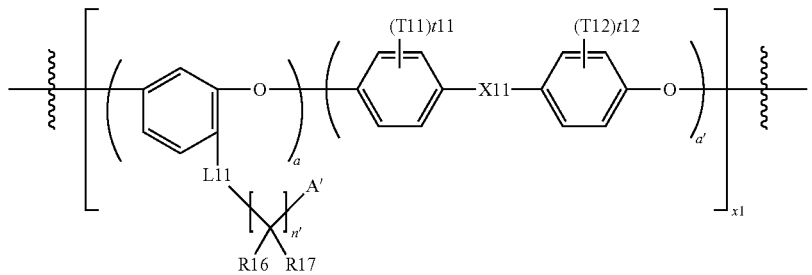

-continued

[Chemical Formula 4-3]

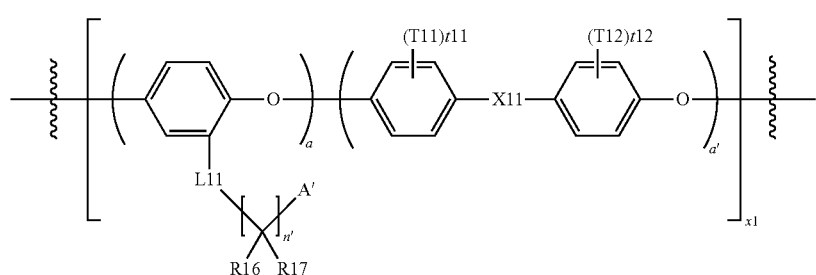

In Chemical Formulae 4-1 to 4-3, substituents have the same definitions as in Chemical Formula 4.

According to one embodiment of the present specification, the hydrophobic block of the polymer comprised in the polymer separator includes a unit derived from a fluorine-containing compound.

According to one embodiment of the present specification, the fluorine-containing compound may be decafluorobiphenyl.

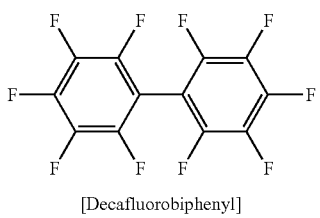 [SMILES: Fc1c(F)c(F)c(-c2c(F)c(F)c(F)c(F)c2F)c(F)c1F]

[Decafluorobiphenyl]

According to one embodiment of the present specification, the fluorine-containing compound may be a compound represented by the following Chemical Formula 3.

[Chemical Formula 3]

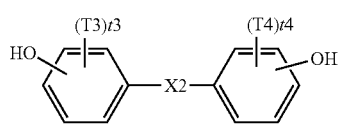

In Chemical Formula 3,

X2 is a direct bond; —C(Z3)(Z4)-; —O—; —S—; —SO$_2$—; —CO—; or —Si(Z3)(Z4)-,

Z3 and Z4 are the same as or different from each other, and each independently hydrogen; deuterium; a halogen group; a substituted or unsubstituted alkyl group; or a substituted or unsubstituted aryl group, T3 and T4 are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted amine group; a substituted or unsubstituted aryl group; or a substituted or unsubstituted heteroaryl group, t3 and t4 are an integer of 0 to 4, and when t3 and t4 are an integer of 2 or greater, substituents in the parentheses are the same as or different from each other, however, X2 is —C(Z3)(Z4)-; or —Si(Z3)(Z4)-, and Z3 and Z4 are the same as or different from each other and each independently an alkyl group substituted with a halogen group, or X2 is a direct bond; —C(Z3)(Z4)-; —O—; —S—; —SO$_2$—; —CO—; or —Si(Z3)(Z4)-, and when Z3 and Z4 are not an alkyl group substituted with a halogen group, T3 and T4 are the same as or different from each other and each independently a halogen group; an alkyl group substituted with a halogen group; or an aryl group substituted with a halogen group, and t3 and t4 are an integer of 1 to 4.

According to one embodiment of the present specification, X2 is a direct bond.

According to one embodiment of the present specification, X2 is —C(Z3)(Z4)-.

According to one embodiment of the present specification, X2 is —O—.

According to one embodiment of the present specification, X2 is —S—.

According to one embodiment of the present specification, X2 is —SO$_2$—.

According to one embodiment of the present specification, X2 is —CO—.

According to one embodiment of the present specification, X2 is —Si(Z3)(Z4)-.

According to one embodiment of the present specification, X2 is —C(Z3)(Z4)-; or —Si(Z3)(Z4)-, and Z3 and Z4 are the same as or different from each other and each independently an alkyl group substituted with F, or X2 is a direct bond; —C(Z3)(Z4)-; —O—; —S—; —SO$_2$—; —CO—; or —Si(Z3)(Z4)-, and when Z3 and Z4 are not an alkyl group substituted with F, T3 and T4 are the same as or different from each other and each independently F; an alkyl group substituted with F; or an aryl group substituted with F, and t3 and t4 are an integer of 1 to 4.

According to one embodiment of the present specification, X2 is —C(Z3)(Z4)-; or —Si(Z3)(Z4)-, Z3 and Z4 are —CF$_3$, or X2 is a direct bond; —C(Z3)(Z4)-; —O—; —S—; —SO$_2$—; —CO—; or —Si(Z3)(Z4)-, and when Z3 and Z4 are not —CF$_3$, T3 and T4 are the same as or different from each other and each independently F; an alkyl group substituted with F; or an aryl group substituted with F, and t3 and t4 are an integer of 1 to 4.

According to one embodiment of the present specification, the hydrophobic block may include a repeating unit represented by the following Chemical Formula 5.

[Chemical Formula 5]

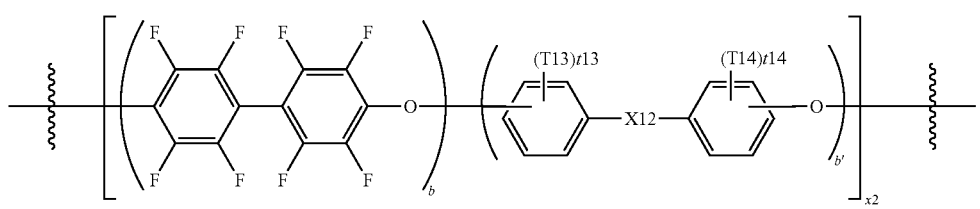

In Chemical Formula 5, x2, b and b' are, as a repetition number of units in the parentheses, an integer of 1 to 1,000, and b:b' is from 1,000:1 to 1:1,000, X12 is a direct bond; —C(Z13)(Z14)-; —O—; —S—; —SO$_2$—; —CO—; or —Si(Z13)(Z14)-, Z13 and Z14 are the same as or different from each other, and each independently hydrogen; deuterium; a halogen group; a substituted or unsubstituted alkyl group; or a substituted or unsubstituted aryl group, T13 and T14 are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted amine group; a substituted or unsubstituted aryl group; or a substituted or unsubstituted heteroaryl group, t13 and t14 are an integer of 0 to 4, and when t13 and t14 are an integer of 2 or greater, substituents in the parentheses are the same as or different from each other, however, X12 is —C(Z13)(Z14)-; or —Si(Z13)(Z14)-, and Z13 and Z14 are the same as or different from each other and each independently an alkyl group substituted with a halogen group, or X12 is a direct bond; —C(Z13)(Z14)-; —O—; —S—; —SO$_2$—; —CO—; or —Si(Z13)(Z14)-, and when Z13 and Z14 are not an alkyl group substituted with a halogen group, T13 and T14 are the same as or different from each other and each independently a halogen group; an alkyl group substituted with a halogen group; or an aryl group substituted with a halogen group, and t13 and t14 are an integer of 1 to 4.

According to one embodiment of the present specification, Chemical Formula 5 may be represented by the following Chemical Formula 5-1.

In Chemical Formula 5-1, substituents have the same definitions as in Chemical Formula 5.

According to one embodiment of the present specification,

means capable of bonding to adjacent substituents or a main chain of the polymer.

According to one embodiment of the present specification, the polymer may be a block polymer including a hydrophilic block and a hydrophobic block.

According to one embodiment of the present specification, the polymer may further include a brancher.

In the present specification, the "brancher" means performing a role of linking or crosslinking polymer chains.

According to one embodiment of the present specification, the brancher may perform a role of linking or crosslinking polymer chains.

According to one embodiment of the present specification, the brancher may directly form a main chain of the polymer in the polymer further including the brancher, and a mechanical degree of integration of a thin membrane may be enhanced. For example, in the branched polymer according to one embodiment of the present specification, the brancher directly forms a main chain of the polymer without carrying out a post-sulfonation reaction or a cross-linking reaction of a sulfonated polymer by polymerizing branched hydrophobic blocks that do not include acid substituents and branched hydrophilic blocks that include acid substituents, and the hydrophobic blocks maintaining a mechanical degree of integration of a thin membrane and the hydrophilic

[Chemical Formula 5-1]

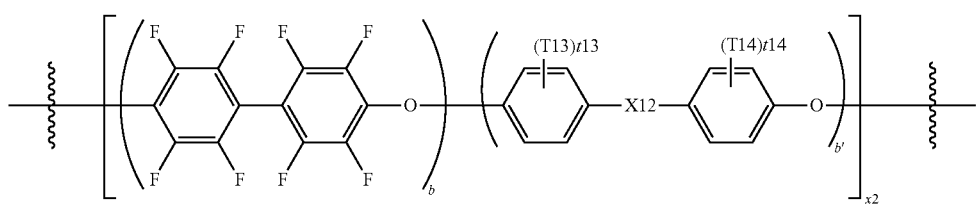

blocks providing ion conductivity to the thin membrane are alternately linked through chemical bonds.

According to one embodiment of the present specification, the polymer may further include a brancher derived from a compound of the following Chemical Formula 6 or a brancher represented by the following Chemical Formula 7.

$$Q1\text{---}(\text{---}X\text{---})_l\text{---}Q2 \quad \text{[Chemical Formula 6]}$$

[Chemical Formula 7]

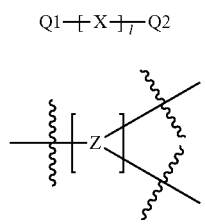

In Chemical Formulae 6 and 7,

X is S; O; CO; SO; $SO_2$; NR; a hydrocarbon-based or fluorine-based assembly, l is an integer of 0 to 100, and when l is 2 or greater, two or more Xs are the same as or different from each other, Q1 and Q2 are the same as or different from each other, and each independently an aromatic ring in which one, two or more are substituted with substituents selected from the group consisting of a hydroxyl group and a halogen group; an aliphatic ring in which one, two or more are substituted with substituents selected from the group consisting of a hydroxyl group and a halogen group; or an amine group represented by NR'R", R, R' and R" are an aromatic ring substituted with a halogen group; or an aliphatic ring substituted with a halogen group, and Z is a trivalent organic group.

In the present specification, the "organic group" may include an alkyl group, a cycloalkyl group, an aryl group, a heteroaryl group and the like. The organic group may include bonds or substituents besides a hydrocarbon group such as heteroatoms therein. In addition, the organic group may be any of linear, branched or cyclic.

In the present specification, the "trivalent organic group" means a trivalent group having 3 bonding sites in an organic compound.

In addition, according to one embodiment of the present specification, the organic group may form a cyclic structure, and, as long as effects of the disclosure are not impaired, bonds may be formed including heteroatoms. Specifically, bonds including heteroatoms such as an oxygen atom, a nitrogen atom and a silicon atom may be included. Specific examples thereof may include ether bonds, thioether bonds, carbonyl bonds, thiocarbonyl bonds, ester bonds, amide bonds, urethane bonds, imino bonds (—N=C(—W)—, —C(=NW)—; W represents a hydrogen atom or an organic group), carbonate bonds, sulfonyl bonds, sulfinyl bonds, azo bonds and the like, but are not limited thereto.

In the present specification, examples of the cyclic structure may include the aromatic ring and the aliphatic ring described above, and the like, and the cyclic structure may be monocyclic or polycyclic.

In the present specification, the aromatic ring may be a substituted or unsubstituted aromatic hydrocarbon ring or aromatic heteroring, and may be monocyclic or polycyclic.

In the present specification, examples of the aromatic hydrocarbon ring may include a monocyclic aromatic ring such as a phenyl group, a biphenyl group or a terphenyl group, a polycyclic aromatic ring such as a naphthyl group, a binaphthyl group, an anthracenyl group, a phenanthrenyl group, a pyrenyl group, a perylenyl group, a tetracenyl group, a chrysenyl group, a fluorenyl group, an acenaphtacenyl group, triphenylene group or a fluoranthene group, and the like, but are not limited thereto. In the present specification, descriptions on the aryl group provided above may be applied to the aromatic hydrocarbon ring.

In the present specification, the aromatic heteroring means a structure including, in the aromatic hydrocarbon ring, one or more heteroatoms, for examples, atoms selected from the group consisting of N, P, O, S, Se, Ge, Si and the like, instead of a carbon atom, and descriptions on the heteroaryl group provided above may be applied. Specific examples thereof may include a thiophene group, a furan group, a pyrrole group, an imidazole group, a triazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a quinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, a thiadiazolyl group, a phenothiazinyl group, a dibenzofuranyl group and the like, but are not limited thereto.

In the present specification, the aliphatic ring may be a substituted or unsubstituted aliphatic hydrocarbon ring or aliphatic heteroring, and may be monocyclic or polycyclic.

In the present specification, descriptions on the cycloalkyl group provided above may be applied to the aliphatic hydrocarbon ring.

In the present specification, the aliphatic heteroring means a structure including, in the aliphatic hydrocarbon ring, one or more heteroatoms, for examples, atoms selected from the group consisting of N, P, O, S, Se, Ge, Si and the like, instead of a carbon atom.

In the present specification, descriptions on the aromatic heteroring and the aliphatic heteroring provided above may be applied to the heterocyclic group.

According to one embodiment of the present specification, Z is a trivalent substituted or unsubstituted alkyl group.

According to one embodiment of the present specification, Z is a trivalent alkyl group.

According to one embodiment of the present specification, the brancher derived from the compound of Chemical Formula 6 may function as a brancher as, in each of the aromatic ring substituted with a halogen group; the aliphatic ring substituted with a halogen group; or the amine group represented by NR'R" of Q1 and Q2, the halogen group falls off from the aromatic ring or the aliphatic ring.

According to one embodiment of the present specification, l is an integer of 3 or greater.

According to one embodiment of the present specification, X is S.

According to another embodiment of the present specification, X is a haloalkylene group.

According to another embodiment of the present specification, X is NR.

According to one embodiment of the present specification, Q1 and Q2 are the same as or different from each other, and each independently an aromatic ring substituted with a halogen group.

According to one embodiment of the present specification, Q1 and Q2 are the same as or different from each other, and each independently an aromatic hydrocarbon ring substituted with F.

According to one embodiment of the present specification, Q1 and Q2 are the same as or different from each other, and each independently an amine group represented by NR'R".

According to another embodiment of the present specification, Q1 and Q2 are each a phenyl group substituted with fluorine. Specific examples thereof may include 2,4-difluorophenyl, 2,6-difluorophenyl, 2,3-difluorophenyl, 3,4-difluorophenyl and the like, but are not limited thereto.

According to one embodiment of the present specification, the compound of Chemical Formula 6 may be represented by any one selected from among the following structures.

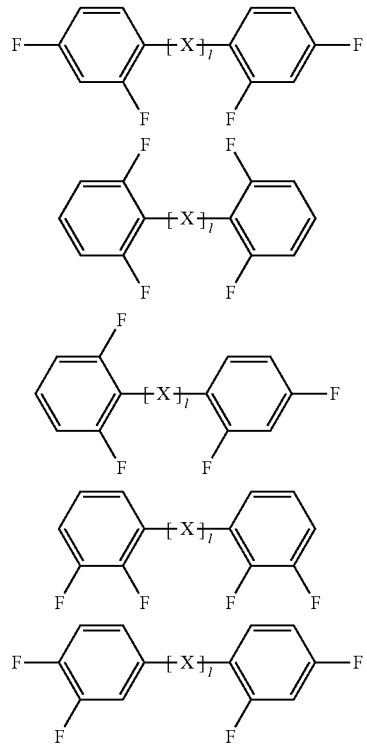

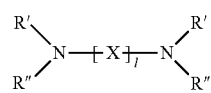

In the structures, X, 1, R' and R" have the same definitions as in Chemical Formula 6.

According to one embodiment of the present specification, Z of Chemical Formula 7 may be represented by one selected selected from among the following Chemical Formulae 7-1 to 7-4.

[Chemical Formula 7-1]

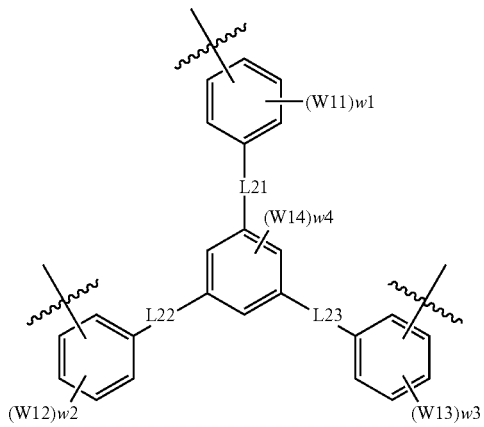

[Chemical Formula 7-2]

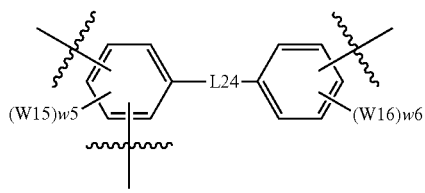

[Chemical Formula 7-3]

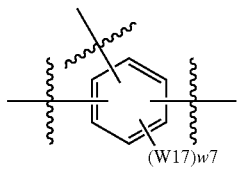

[Chemical Formula 7-4]

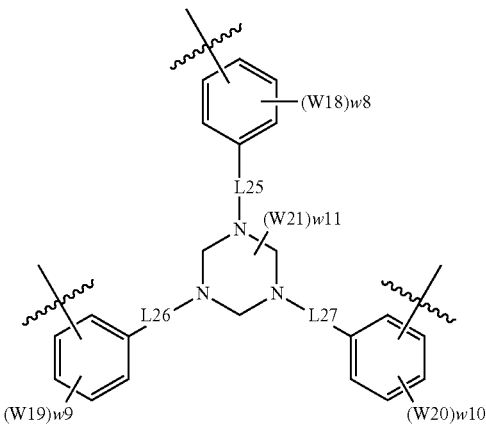

In Chemical Formulae 7-1 to 7-4,

L21 to L27 are the same as or different from each other, and each independently a direct bond; —S—; —O—; —CO—; or —SO$_2$—, W11 to W21 are the same as or different from each other, and each independently hydrogen; deuterium; a halogen group; a nitrile group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted aryl group; or a substituted or unsubstituted heterocyclic group, and w1, w2, w3, w6, w8, w9 and w10 are each an integer of 1 to 4, w4, w5 and w7 are each an integer of 1 to 3, w11 is an integer of 1 to 6, and when w1 to w11 are each an integer of 2 or greater, two or more structures in the parentheses are the same as or different from each other.

According to one embodiment of the present specification, L21 is CO.

According to one embodiment of the present specification, L21 is $SO_2$.

According to one embodiment of the present specification, L21 is S.

According to one embodiment of the present specification, L22 is CO.

According to one embodiment of the present specification, L22 is $SO_2$.

According to one embodiment of the present specification, L22 is S.

According to one embodiment of the present specification, L23 is CO.

According to one embodiment of the present specification, L23 is $SO_2$.

According to one embodiment of the present specification, L23 is S.

According to one embodiment of the present specification, L24 is CO.

According to one embodiment of the present specification, L24 is $SO_2$.

According to one embodiment of the present specification, L25 is a direct bond.

According to one embodiment of the present specification, L26 is a direct bond.

According to one embodiment of the present specification, L27 is a direct bond.

According to one embodiment of the present specification, W11 to W21 are hydrogen.

According to one embodiment of the present specification, W11 to W16, and W18 to W21 are each hydrogen.

According to one embodiment of the present specification, W17 is a halogen group.

According to one embodiment of the present specification, W17 is fluorine (F).

According to one embodiment of the present specification, W17 is hydrogen (H).

According to one embodiment of the present specification, the brancher represented by Chemical Formula 7 may be represented by one selected from among the following structures.

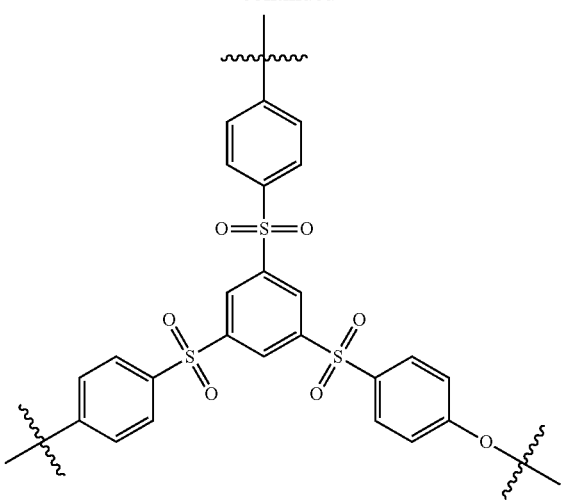

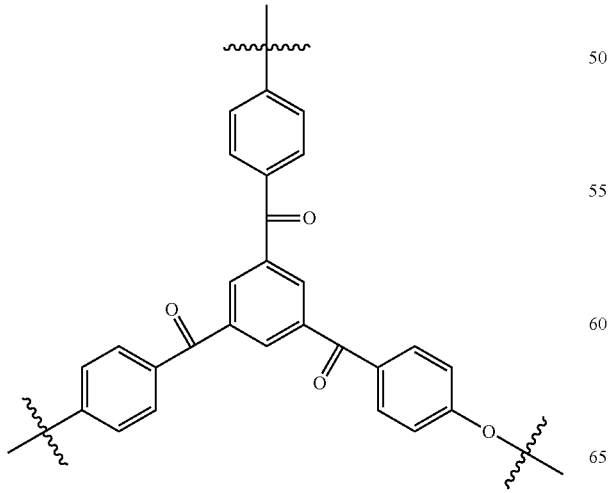

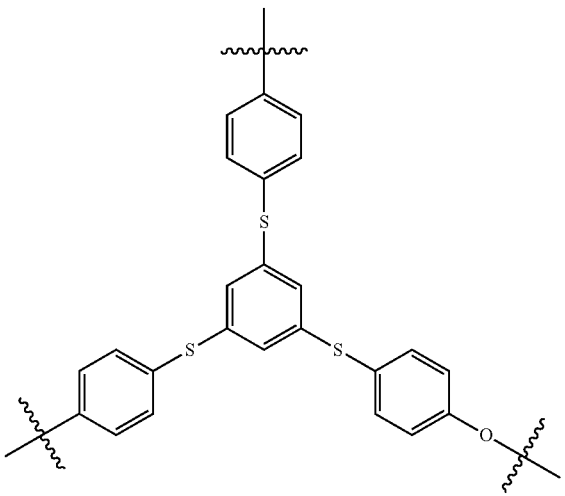

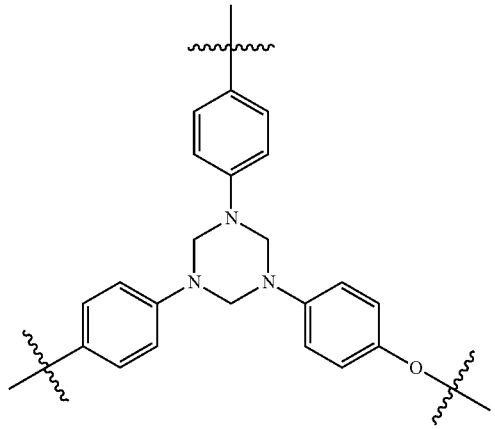

23
-continued
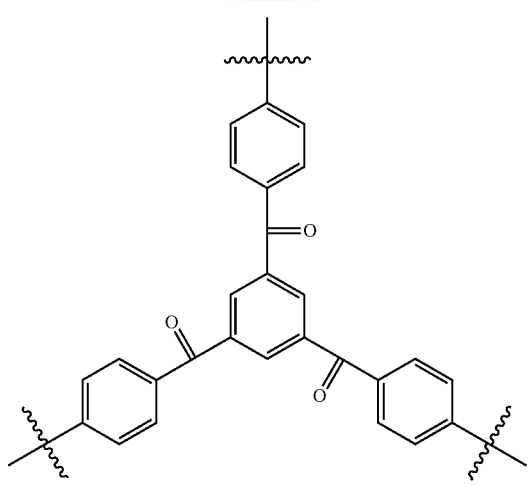
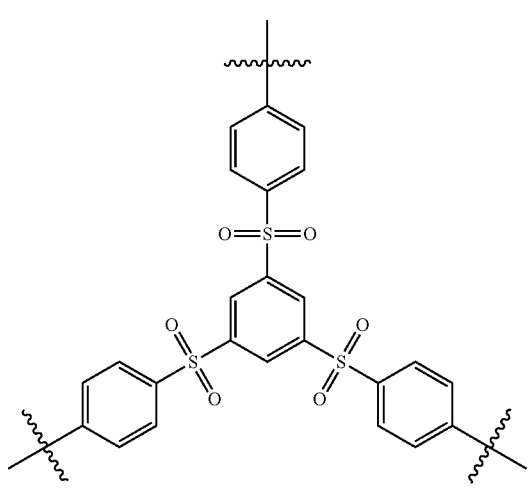
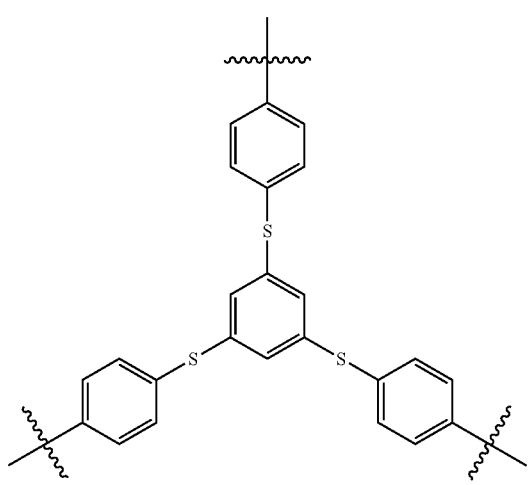
24
-continued
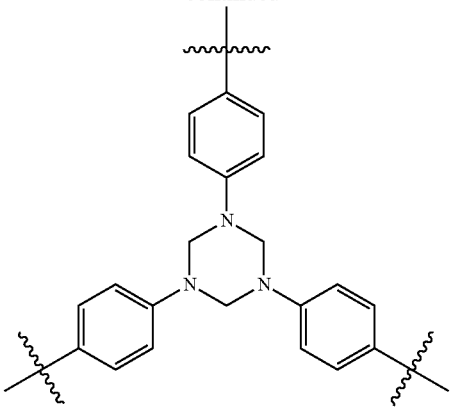
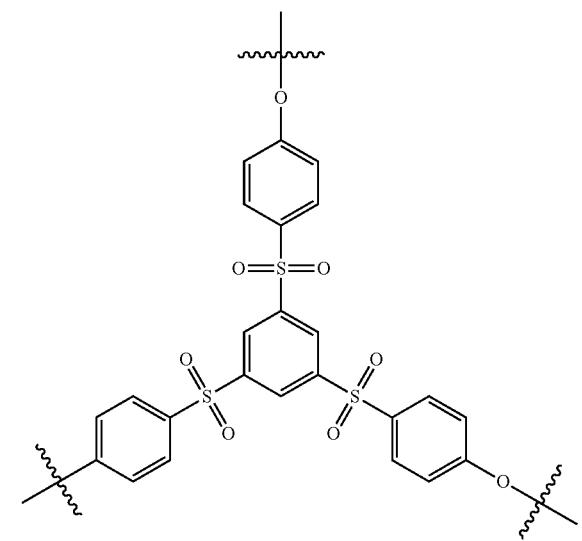

25
-continued
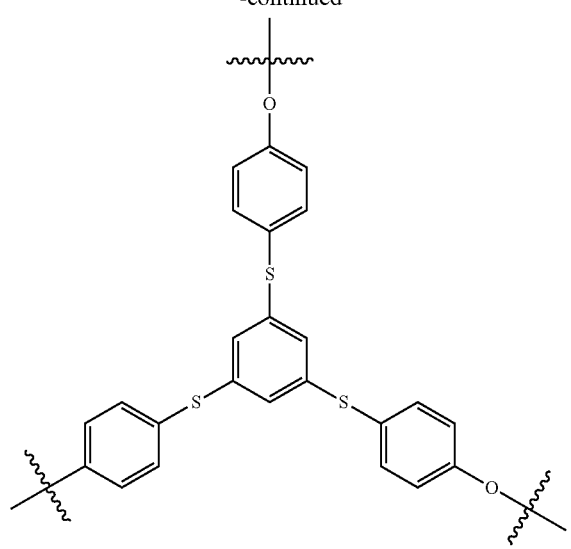
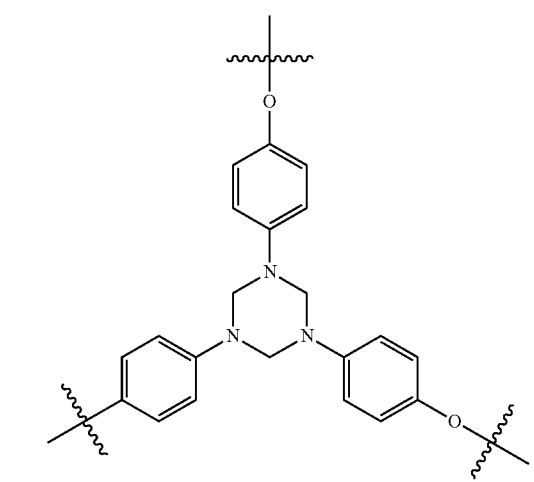
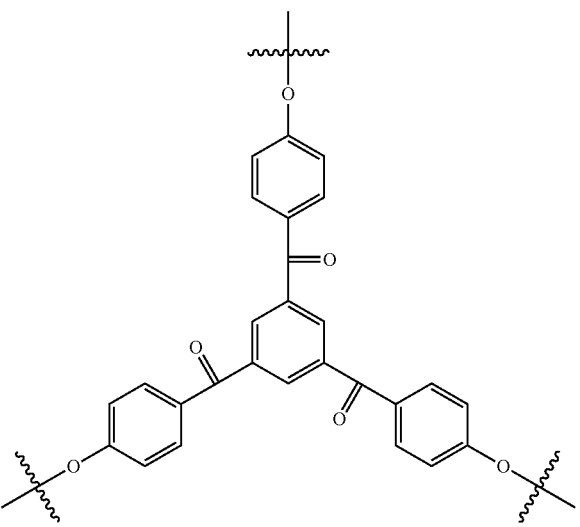
26
-continued
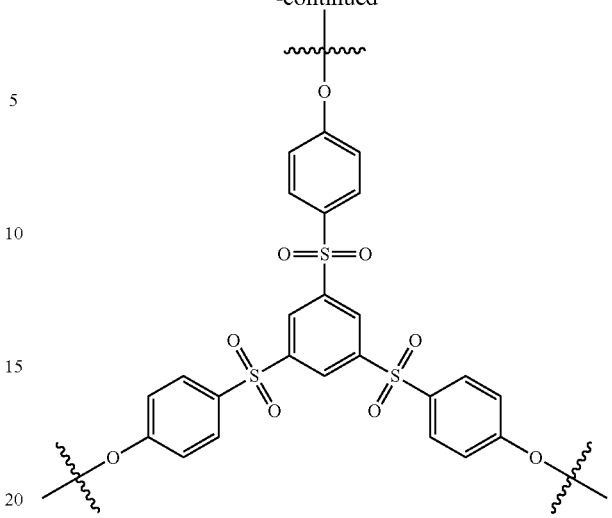
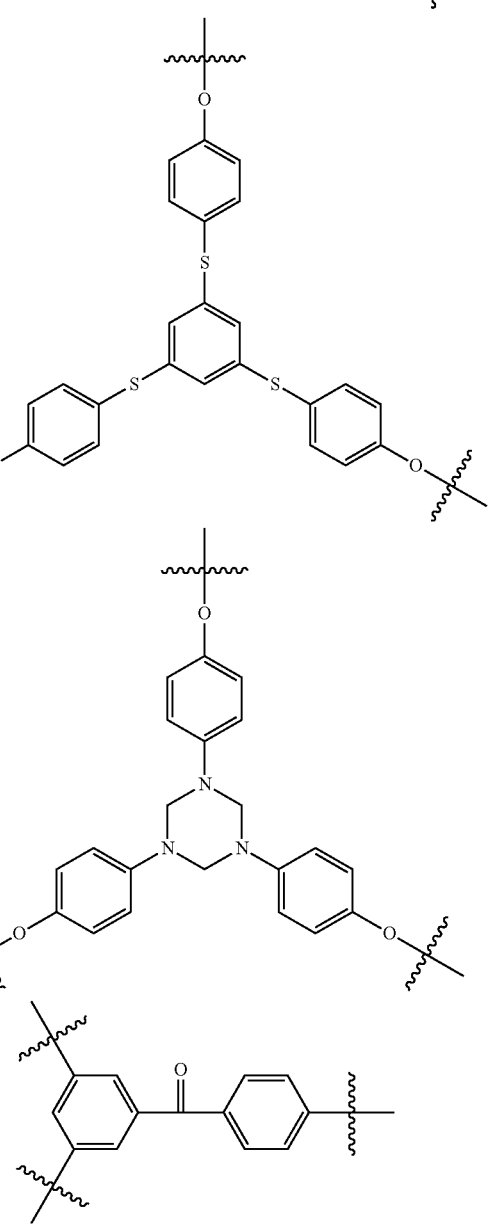
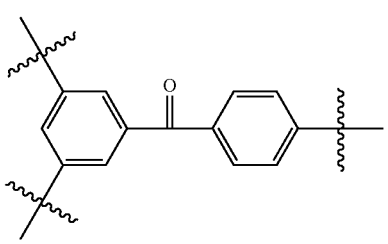

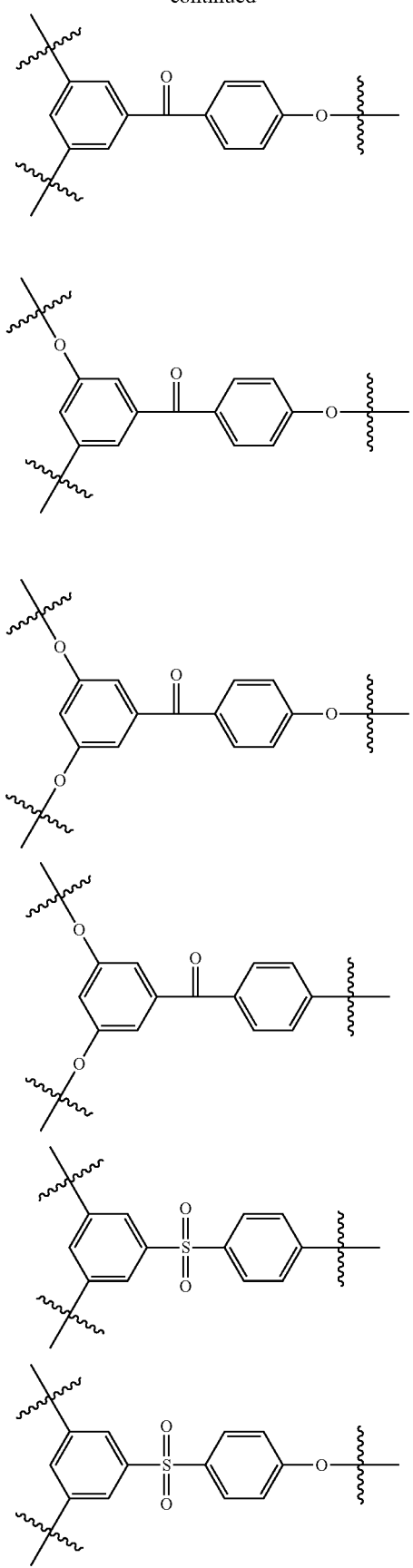
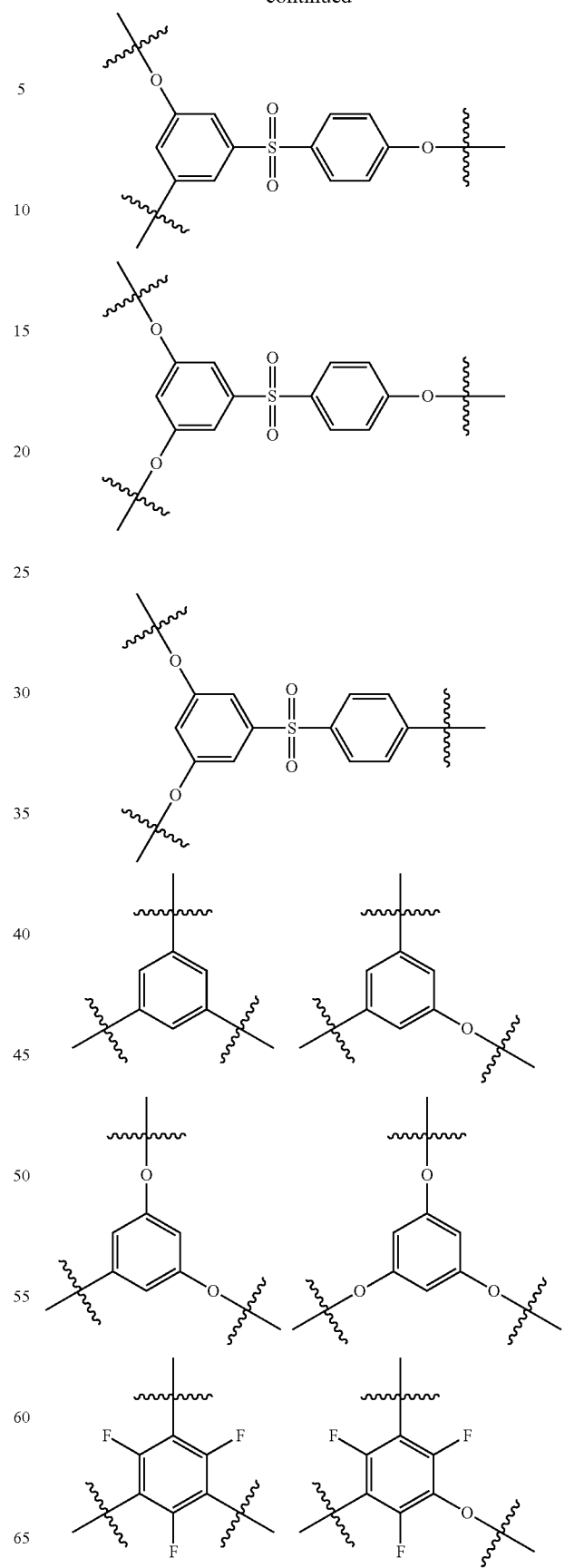

-continued

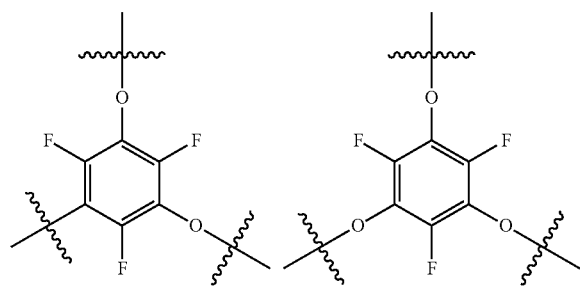

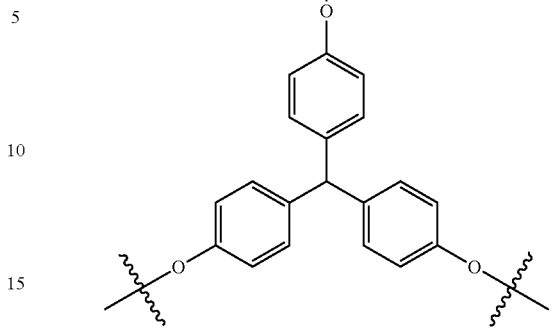

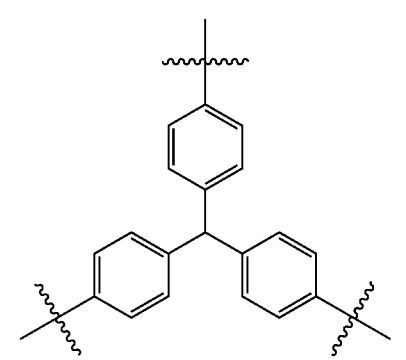

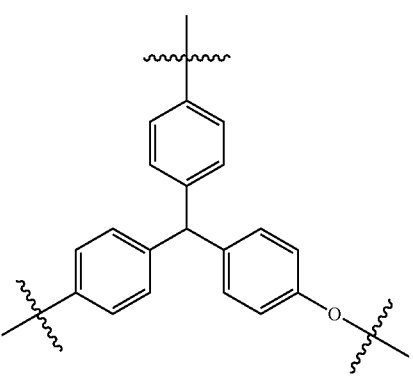

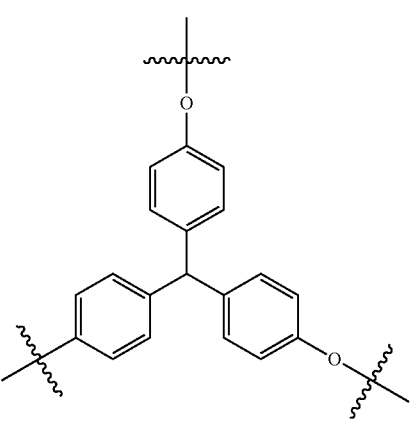

According to one embodiment of the present specification, the polymer has a weight average molecular weight of 1,000 g/mol to 1,200,000 g/mol. According to a specific embodiment, the weight average molecular weight is from 10,000 g/mol to 1,000,000 g/mol and more preferably from 10,000 g/mol to 800,000 g/mol. When the polymer has a weight average molecular weight in the above-mentioned range, mechanical properties of a polymer separator comprising the polymer do not decline, and proper polymer solubility is maintained, and as a result, the separator may be readily prepared.

According to one embodiment of the present specification, the polymer may be a block polymer, and a hydrophilic block of the block polymer may include the unit derived from the compound represented by Chemical Formula 1 and a hydrophobic block of the block polymer may include the unit derived from a fluorine-containing compound described above.

According to one embodiment of the present specification, the polymer may be a block polymer, and a hydrophilic block of the block polymer may include the repeating unit represented by Chemical Formula 4 and a hydrophobic block of the block polymer may include the repeating unit represented by Chemical Formula 5.

According to one embodiment of the present specification, the hydrophilic block and the hydrophobic block are included in a molar ratio of 1:0.1 to 1:10 in the block polymer. According to one embodiment of the present specification, the hydrophilic block and the hydrophobic block are included in a molar ratio of 1:0.1 to 1:2 in the block polymer. According to another embodiment of the present specification, the hydrophilic block and the hydrophobic block are included in a molar ratio of 1:0.8 to 1:1.2 in the block polymer. This may increase an ion transfer ability of the block polymer.

The hydrophilic block according to one embodiment of the present specification includes perfluorosulfonic acid, and high ion conductivity of a polymer separator may be achieved.

In addition, the hydrophobic block according to one embodiment of the present specification includes a large amount of fluorine functional groups, which may decrease water uptake of a polymer separator, and performs a role of increasing mechanical stability of a membrane under a humidity condition.

Accordingly, the polymer according to one embodiment of the present specification is capable of controlling ion exchange capacity (IEC) in a membrane electrode assembly, a fuel cell or a redox flow battery by controlling a ratio of the hydrophilic block and the hydrophobic block.

According to one embodiment of the present specification, the unit derived from the compound represented by Chemical Formula 1 is included in 0.01 mol % to 100 mol % in the hydrophilic block based on the hydrophilic block.

According to one embodiment of the present specification, the hydrophilic block has a weight average molecular weight of 1,000 g/mol to 600,000 g/mol. According to a specific embodiment, the weight average molecular weight is from 2,000 g/mol to 400,000 g/mol. According to another embodiment, the weight average molecular weight is from 5,000 g/mol to 400,000 g/mol.

According to one embodiment of the present specification, the hydrophobic block has a weight average molecular weight of 1,000 g/mol to 600,000 g/mol. According to a specific embodiment, the weight average molecular weight is from 2,000 g/mol to 400,000 g/mol. According to another embodiment, the weight average molecular weight is from 5,000 g/mol to 400,000 g/mol.

According to one embodiment of the present specification, the hydrophilic block and the hydrophobic block are clearly divided and separated in the block polymer and phase separation is readily obtained, and therefore, ions are readily transferred.

According to one embodiment of the present specification, the hydrophilic block and the hydrophobic block are more clearly divided when including the unit derived from the compound represented by Chemical Formula 1, and an ion transfer effect may be more superior compared to existing polymers.

According to one embodiment of the present specification, the block polymer means a polymer formed by one block, and one, two or more blocks that are different from the one block being linked to each other by a polymer main chain.

On embodiment of the present specification provides a polymer separator comprising the polymer described above.

According to one embodiment of the present specification, the polymer separator may be prepared using materials and/or methods known in the art except for including the unit derived from the compound represented by Chemical Formula 1 in a hydrophilic block and the unit derived from a fluorine-containing compound in a hydrophobic block in the polymer. For example, the polymer separator may be prepared by coating a solution including the polymer, and drying and/or curing the result.

According to one embodiment of the present specification, methods of a tape casting method, a dip coating method, a spray coating method or a spin coating method may be used as the coating.

According to one embodiment of the present specification, N,N-dimethylacetamide (DMAc), dimethyl sulfoxide (DMSO), N,N-dimethyl pyrrolidone (NMP), diphenylsulfone, N,N-dimethylformamide (DMF) and the like may be used as a solvent used for preparing the polymer separator, however, the solvent is not limited thereto.

According to one embodiment of the present specification, the drying may be performed by heating.

According to one embodiment of the present specification, the heating means drying through heating.

According to one embodiment of the present specification, the heating temperature may be higher than or equal to 30° C. and lower than or equal to 200° C., and specifically higher than or equal to 50° C. and lower than or equal to 150° C.

According to one embodiment of the present specification, the heating time may be longer than or equal to 1 hour and shorter than or equal to 46 hours, and specifically longer than or equal to 5 hours and shorter than or equal to 20 hours.

According to one embodiment of the present specification, the method for preparing the polymer separator may further include adding an acid solution to the solution including the polymer. The acid solution may be hydrochloric acid (HCl).

According to one embodiment of the present specification, the metal M of A of Chemical Formula 1 may be substituted with H (hydrogen) when adding an acid solution to the solution including the polymer.

According to one embodiment of the present specification, the heating may be preheating for 2 hours to 6 hours at 50° C. to 70° C., drying for 12 hours or longer at 80° C., and lastly, drying for 12 hours or longer in a 80° C. vacuum oven.

According to one embodiment of the present specification, the polymer separator has ion conductivity of 0.005 S/cm to 0.8 S/cm. Preferably, the ion conductivity is from 0.005 S/cm to 0.5 S/cm.

According to one embodiment of the present specification, the polymer separator has cation conductivity of 0.005 S/cm to 0.8 S/cm. Preferably, the cation conductivity is from 0.005 S/cm to 0.5 S/cm.

According to one embodiment of the present specification, ion conductivity (cation conductivity) of the polymer separator may be measured while varying a humidity condition. In the present specification, the humidity condition may mean relative humidity (RH) of 10% to 100%.

According to one embodiment of the present specification, the ion conductivity may be measured as follows. Before measurement, the polymer separator is sufficiently immersed in DI water for 24 hours. After cutting the separator specimen into 1 cm²×5 cm², membrane resistance is measured using a cell as follows. Impedance is measured in a range of 10 MHz to 7 Hz while being immersed in water using a potentio-galvano station (SP-240).

Ion conductivity of the polymer separator may be calculated using the measured membrane resistance, and the calculation formula is as follows.

$$\text{Ion conductivity}(\partial) = 1/(R \times d)$$

Herein, 1 is a distance (1 cm) between two electrodes, R is membrane resistance measured through SP-240, and d is an ion exchange membrane thickness (cm). The unit of the ion conductivity is obtained in S/cm.

In the present specification, the ion conductivity may mean cation conductivity.

According to one embodiment of the present specification, the polymer separator has an ion exchange capacity (IEC) value of 0.01 mmol/g to 5.0 mmol/g. When having the ion exchange capacity value in the above-mentioned range, ion channels are formed in the polymer separator, and the polymer may exhibit excellent ion conductivity.

According to one embodiment of the present specification, the polymer separator has a thickness of 1 μm to 500 μm. The polymer separator having the above-mentioned thickness range reduces electric short and an electrolyte material crossover, and may exhibit excellent cation conductivity properties.

One embodiment of the present specification also provides a membrane electrode assembly comprising an anode; a cathode; and the above-described polymer separator provided between the anode and the cathode.

In the present specification, the "membrane electrode assembly (MEA)" means an assembly of electrodes (cathode and anode) in which an electrochemical catalyst reaction of fuel and air occurs and a polymer membrane in which hydrogen ion transfer occurs, and is a single assembled unit in which electrodes (cathode and anode) and a separator are adhered.

According to one embodiment of the present specification, the membrane electrode assembly has a form of a catalyst layer of an anode and a catalyst layer of a cathode being brought into contact with a polymer separator, and may be prepared using common methods known in the art. As one example, the membrane electrode assembly may be prepared through thermocompressing the cathode; the anode; and the polymer separator located between the cathode and the anode at 100° C. to 400° C. while sticking these together.

According to one embodiment of the present specification, an anode electrode may comprise an anode catalyst layer and an anode gas diffusion layer. The anode gas diffusion layer may again comprise an anode micropore layer and an anode electrode base.

According to one embodiment of the present specification, a cathode electrode may comprise a cathode catalyst layer and a cathode gas diffusion layer. The cathode gas diffusion layer may again comprise a cathode micropore layer and a cathode electrode base.

FIG. 1 is a diagram schematically showing a principle of electricity generation of a fuel cell, and in the fuel cell, a most basic unit generating electricity is a membrane electrode assembly (MEA), and this is formed with a separator (100), and anode (200a) and cathode (200b) electrodes formed on both sides of this separator (100). When referring to FIG. 1 showing a principle of electricity generation of a fuel cell, an oxidation reaction of a fuel such as hydrogen, or hydrocarbon such as methanol or butane occurs in the anode (200a) to generate hydrogen ions ($H^+$) and electrons ($e^-$), and the hydrogen ions migrate to the cathode (200b) through the separator (100). In the cathode (200b), water is produced through the reaction of the hydrogen ions transferred through the separator (100), an oxidizer such as oxygen, and electrons. Electrons migrate to an external circuit through such a reaction.

The anode electrode catalyst layer is a place where an oxidation reaction of a fuel occurs, and catalysts selected from the group consisting of platinum, ruthenium, osmium, platinum-ruthenium alloys, platinum-osmium alloys, platinum-palladium alloys and platinum-transition metal alloys may be preferably used. The cathode electrode catalyst layer is a place where a reduction reaction of an oxidizer occurs, and platinum or platinum-transition metal alloys may be preferably used as catalysts. The catalysts may be used as they are, or may be used while being supported on a carbon-based carrier.

The process of introducing the catalyst layer may be carried out using common methods known in the art, and for example, a catalyst ink may be directly coated on the separator, or coated on the gas diffusion layer to form the catalyst layer. Herein, the coating method of the catalyst ink is not particularly limited, and methods of spray coating, tape casting, screen printing, blade coating, die coating, spin coating or the like may be used. The catalyst ink may be typically formed with a catalyst, a polymer ionomer and a solvent.

The gas diffusion layer becomes a migration path of reaction gases and water while performing a role of a current conductor, and has a porous structure. Accordingly, the gas diffusion layer may be formed including a conductive base. As the conductive base, carbon paper, carbon cloth or carbon felt may be preferably used.

The gas diffusion layer may be formed further comprising a micropore layer between the catalyst layer and the conductive base. The micropore layer may be used for enhancing fuel cell performance under a low humidity condition, and performs a role of allowing the polymer separator to be under a sufficiently wet condition by keeping the amount of water escaping outside the gas diffusion layer to be small.

One embodiment of the present specification provides a polymer electrolyte membrane-type fuel cell comprising two or more of the membrane electrode assemblies described above; a stack comprising a bipolar plate provided between the membrane electrode assemblies; a fuel supply unit supplying a fuel to the stack; and an oxidizer supply unit supplying an oxidizer to the stack.

A fuel cell is an energy conversion device directly converting chemical energy of a fuel into electric energy. In other words, a fuel cell employs a power generation method utilizing a fuel gas and an oxidizer, and using electrons generated during the oxidation and reduction reactions thereof to produce power.

The fuel cell may be prepared through common methods known in the art using the membrane electrode assembly (MEA) described above. For example, the fuel cell may be prepared by forming with the membrane electrode assembly (MEA) prepared above and a bipolar plate.

In the present specification, the fuel cell is formed comprising a stack, a fuel supply unit and an oxidizer supply unit.

FIG. 3 is a diagram schematically illustrating the fuel cell, and the fuel cell is formed comprising a stack (60), an oxidizer supply unit (70) and a fuel supply unit (80).

The stack (60) comprises one, two or more of the membrane electrode assemblies described above, and when two or more of the membrane electrode assemblies are comprised, a separator provided therebetween is comprised. The separator prevents the membrane electrode assemblies from being electrically connected, and performs a role of transferring fuel and oxidizer supplied from the outside to the membrane electrode assemblies.

The oxidizer supply unit (70) performs a role of supplying an oxidizer to the stack (60). As the oxidizer, oxygen is typically used, and oxygen or air may be injected with a pump to be used.

The fuel supply unit (80) performs a role supplying a fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may include methanol, ethanol, propanol, butanol or natural gas.

The fuel cell may comprise a polymer electrolyte membrane fuel cell, a direct liquid fuel cell, a direct methanol fuel cell, a direct formic acid fuel cell, a direct ethanol fuel cell, a direct dimethyl ether fuel cell or the like.

According to one embodiment of the present specification, effects described above may be obtained when using the polymer separator as an ion exchange membrane of the fuel cell.

In addition, one embodiment of the present specification provides a redox flow battery comprising a positive electrode cell comprising a positive electrode and a positive electrode electrolyte liquid; a negative electrode cell comprising a negative electrode and a negative electrode electrolyte liquid; and the above-described polymer separator provided between the positive electrode cell and the negative electrode cell.

A redox flow battery (oxidation-reduction flow battery) is a system charged-discharged by active materials included in an electrolyte liquid being oxidized-reduced, and is an electrochemical storage device directly storing chemical energy of the active materials as electric energy. A redox flow battery uses a principle of being charged and discharged from the exchange of electrons occurring when electrolyte liquids including active materials in different oxidation states meet with an ion exchange membrane in between. A redox flow battery is generally formed with a tank holding an electrolyte liquid, a battery cell where charge and discharge occur, and a circulating pump for circulating the electrolyte liquid between the tank and the battery cell, and a unit cell of the battery cell comprises an electrode, an electrolyte and an ion exchange membrane.

According to one embodiment of the present specification, effects described above may be obtained when using the polymer separator as an ion exchange membrane of the redox flow battery.

According to one embodiment of the present specification, the redox flow battery may be prepared using common methods known in the art except for comprising the polymer separator.

As illustrated in FIG. 2, the redox flow battery is divided into a positive electrode cell (32) and a negative electrode cell (33) by a separator (31). The positive electrode cell (32) and the negative electrode cell (33) comprise a positive electrode and a negative electrode, respectively. The positive electrode cell (32) is connected to a positive electrode tank (10) for supplying and releasing a positive electrode electrolyte liquid (41) through a pipe. The negative electrode cell (33) is also connected to a negative electrode tank (20) for supplying and releasing a negative electrode electrolyte liquid (42) through a pipe. The electrolyte liquids circulate through pumps (11, 21), and through an oxidation/reduction reaction (that is, a redox reaction) changing the oxidation number of ions, charge and discharge occur in the positive electrode and the negative electrode.

Hereinafter, the present specification will be described in detail with reference to examples in order to specifically describe the present specification. However, the examples according to the present specification may be modified to various different forms, and the scope of the present specification is not to be construed as being limited to the examples described below. The examples of the present specification are provided in order to more fully describe the present specification to those having average knowledge in the art.

<Preparation Example 1> Preparation of Hydrophilic Polymer A

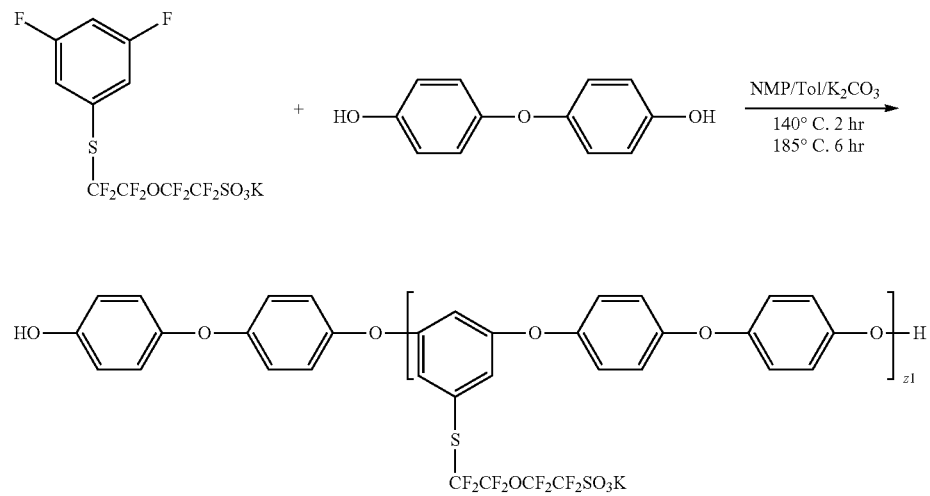

(z1=1 to 1,000)

To a 500 mL three-necked round bottomed flask installed with a dean-stark trap, a nitrogen inlet and a mechanical stirrer, a perfluorinated 3,5-difluorobenzene monomer (30 g, 62.46 mmol) and 4,4'-dihydroxydiphenyl ether (13.892 g, 68.70 mmol) were introduced, and using N-methyl-2-pyrrolidone (NMP) (110 mL) and toluene (50 mL), a reaction was performed under the nitrogen atmosphere using potassium carbonate (37.979 g, 274.80 mmol) as a catalyst.

While stirring the reaction mixture for 2 hours in an oil bath at a temperature of 140° C., water and toluene were removed through reflux distillation. After that, the temperature was raised to 185° C., and the reaction was progressed for 6 hours.

After the reaction, the temperature was lowered to room temperature, and the synthesized hydrophilic polymer solution was slowly dropped to isopropyl (IPA) (2,000 mL) to obtain precipitates. Only the precipitates were obtained through a glass filter, and washed with IPA (200 mL). The obtained hydrophilic polymer was dried for 12 hours at 60° C. in a vacuum oven to prepare Hydrophilic Polymer A.

FIG. 5 is a diagram presenting a $^1$H-NMR spectrum of Hydrophilic Polymer A.

FIG. 6 is a diagram presenting molecular weight distribution of Hydrophilic Polymer A measured using a GPC trace.

Weight average molecular weight (Mw) of Hydrophilic Polymer A: 69,900

<Preparation Example 2> Preparation of Hydrophilic Polymer B

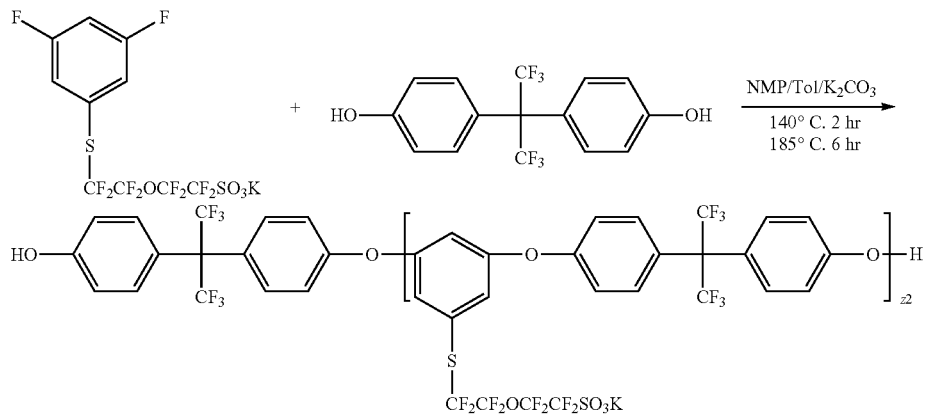

(z2=1 to 1,000)

Hydrophilic Polymer B was prepared in the same manner as in Preparation Example 1 except that 4,4'-(perfluoropropane-2,2-diyl)diphenol (23.099 g, 68.70 mmol) was used instead of 4,4'-dihydroxydiphenyl ether.

FIG. 7 is a diagram presenting a $^1$H-NMR spectrum of Hydrophilic Polymer B.

FIG. 8 is a diagram presenting molecular weight distribution of Hydrophilic Polymer B measured using a GPC trace.

Weight average molecular weight (Mw) of Hydrophilic Polymer B: 80,200

<Example 1> Preparation of Block Polymer I tion Example 1, decafluorobiphenyl (6.048 g, 18.10 mmol), 6-fluoro bisphenol A (5.205 g, 15.48 mmol) and 4,4',4"-trihydroxytriphenyl methane (0.226 g, 0.774 mmol) were introduced, and using NMP (110 mL), a reaction was performed under the nitrogen atmosphere using potassium carbonate (9.199 g, 66.56 mmol) as a catalyst. The reaction was progressed while stirring the reaction mixture for 7 days in an oil bath at a temperature of 40° C.

After the reaction, the result was dropped to an aqueous 1 M HCl solution and stirred for 24 hours. Only the precipitates were obtained through a glass filter, and washed with distilled water until the filtrate indicated neutral. The obtained multiblock copolymer was dried for 2 days at 50° C. in a vacuum oven to prepare Block Polymer I.

FIG. 9 is a diagram presenting a $^1$H-NMR spectrum of Block Polymer I.

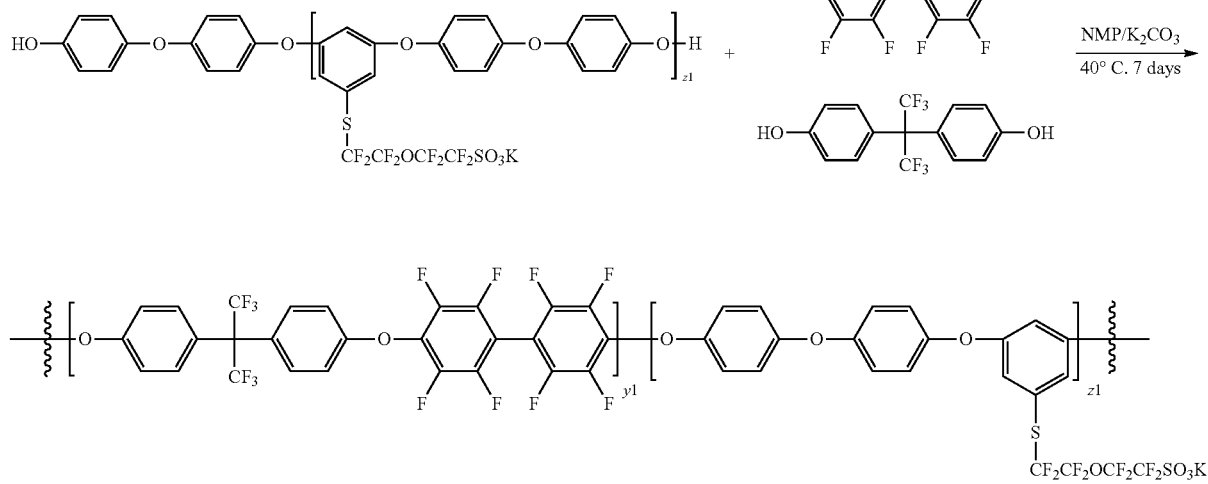

(z1:y1=0.6:0.4)

To a 500 mL three-necked round bottomed flask installed with a dean-stark trap, a nitrogen inlet and a mechanical stirrer, Hydrophilic Polymer A (16 g) prepared in Prepara- FIG. 10 is a diagram presenting molecular weight distribution of Block Polymer I measured using a GPC trace.

Weight average molecular weight (Mw) of Block Polymer I: 604,000

<Example 2> Preparation of Block Polymer II

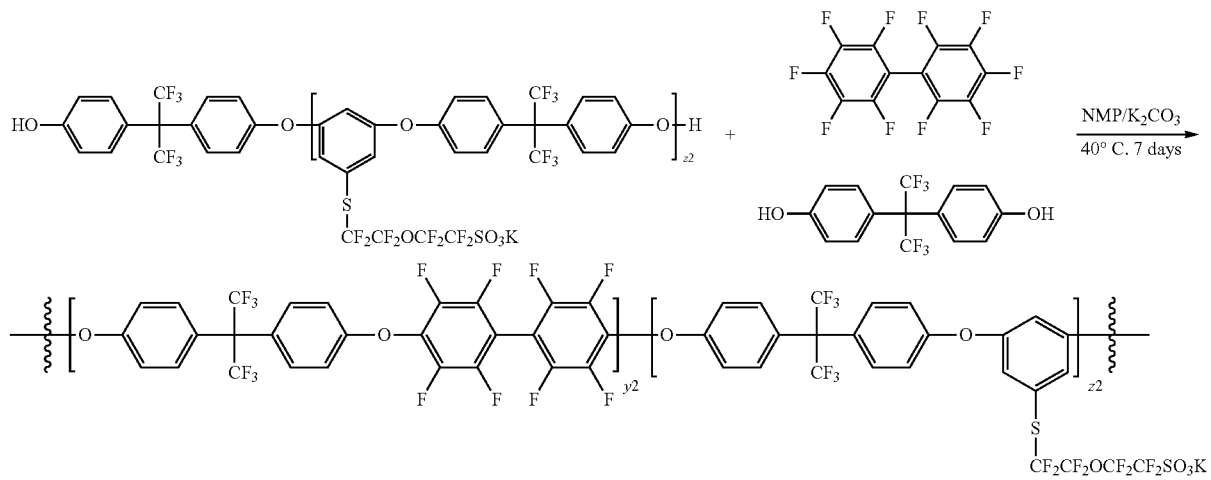

(z2:y2=0.6:0.4)

To a 500 mL three-necked round bottomed flask installed with a dean-stark trap, a nitrogen inlet and a mechanical stirrer, Hydrophilic Polymer B (15 g) prepared in Preparation Example 2, decafluorobiphenyl (5.530 g, 16.55 mmol), 6-fluoro bisphenol A (4.665 g, 13.87 mmol) and 4,4',4"-trihydroxytriphenyl methane (0.285 g, 0.975 mmol) were introduced, and using NMP (105 mL), a reaction was performed under the nitrogen atmosphere using potassium carbonate (8.476 g, 61.33 mmol) as a catalyst. The reaction was progressed while stirring the reaction mixture for 7 days in an oil bath at a temperature of 40° C.

After the reaction, the result was dropped to an aqueous M HCl solution and stirred for 24 hours. Only the precipitates were obtained through a glass filter, and washed with distilled water until the filtrate indicated neutral. The obtained multiblock copolymer was dried for 2 days at 50° C. in a vacuum oven to prepare Block Polymer II.

FIG. 11 is a diagram presenting a $^1$H-NMR spectrum of Block Polymer II.

FIG. 12 is a diagram presenting molecular weight distribution of Block Polymer II measured using a GPC trace.

Weight average molecular weight (Mw) of Block Polymer II: 650,000

<Example 3> Preparation of Block Polymer III

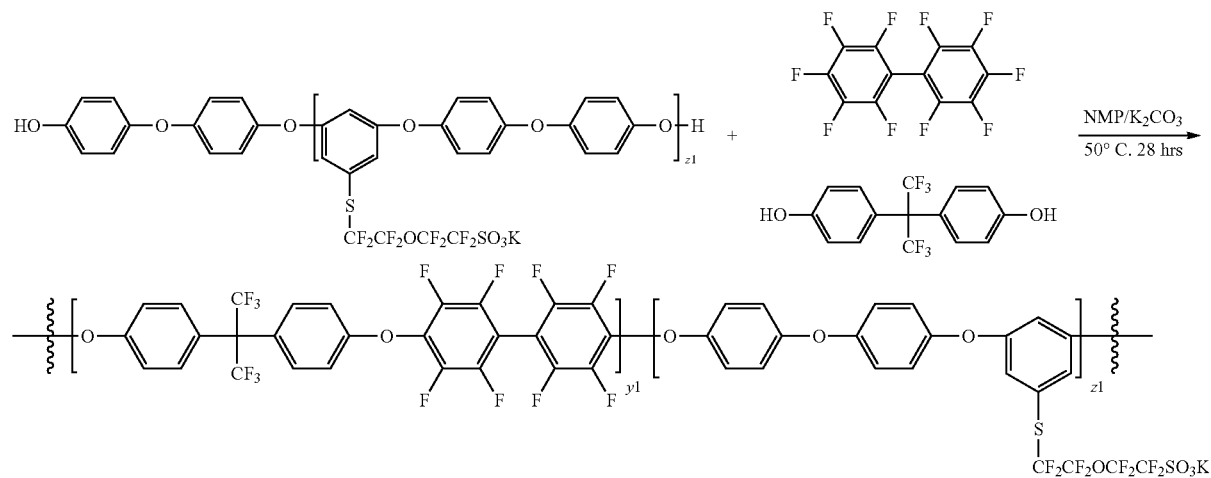

(z1:y1=0.7:0.3)

To a 500 mL three-necked round bottomed flask installed with a dean-stark trap, a nitrogen inlet and a mechanical stirrer, Hydrophilic Polymer A (10 g) prepared in Preparation Example 1, decafluorobiphenyl (2.300 g, 6.88 mmol), 6-fluoro bisphenol A (1.927 g, 5.73 mmol) and 4,4',4"-trihydroxytriphenyl methane (0.167 g, 0.57 mmol) were introduced, and using NMP (30 mL), a reaction was performed under the nitrogen atmosphere using potassium carbonate (3.960 g, 28.65 mmol) as a catalyst. The reaction was progressed while stirring the reaction mixture for 28 hours in an oil bath at a temperature of 50° C.

After the reaction, the result was dropped to an aqueous 1 M HCl solution and stirred for 24 hours. Only the precipitates were obtained through a glass filter, and washed with distilled water until the filtrate indicated neutral. The obtained multiblock copolymer was dried for 2 days at 50° C. in a vacuum oven to prepare Block Polymer III.

FIG. 13 is a diagram presenting a $^1$H-NMR spectrum of Block Polymer III.

Weight average molecular weight (Mw) of Block Polymer III: 454,000

<Example 4> Preparation of Block Polymer IV

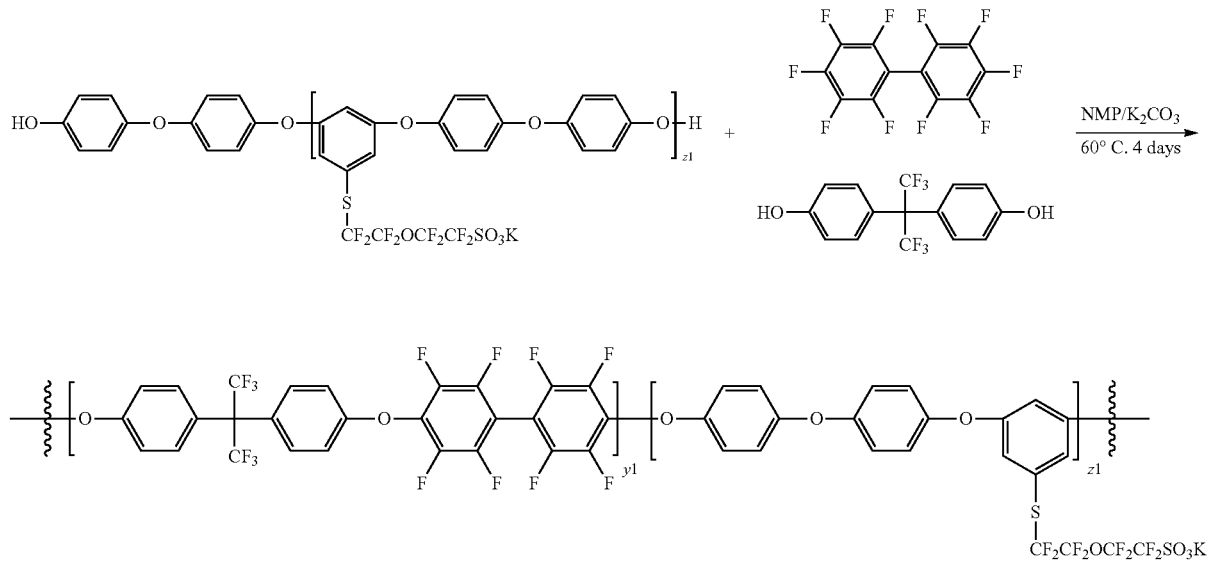

(z1:y1=0.8:0.2)

To a 500 mL three-necked round bottomed flask installed with a dean-stark trap, a nitrogen inlet and a mechanical stirrer, Hydrophilic Polymer A (10 g) prepared in Preparation Example 1, decafluorobiphenyl (1.550 g, 4.64 mmol), 6-fluoro bisphenol A (1.200 g, 3.57 mmol) and 4,4',4"-trihydroxytriphenyl methane (0.105 g, 0.36 mmol) were introduced, and using NMP (20 mL), a reaction was performed under the nitrogen atmosphere using potassium carbonate (2.270 g, 17.85 mmol) as a catalyst. The reaction was progressed while stirring the reaction mixture for 4 days in an oil bath at a temperature of 60° C.

After the reaction, the result was dropped to an aqueous 1 M HCl solution and stirred for 24 hours. Only the precipitates were obtained through a glass filter, and washed with distilled water until the filtrate indicated neutral. The obtained multiblock copolymer was dried for 2 days at 50° C. in a vacuum oven to prepare Block Polymer IV.

FIG. 14 is a diagram presenting a $^1$H-NMR spectrum of Block Polymer IV.

Weight average molecular weight (Mw) of Block Polymer IV: 300,000

Experimental Example 1

After dissolving the block polymer prepared in Example 1 in 20 wt/v % in dimethyl sulfoxide (DMSO), the result was filtered using a 0.45 μm syringe filter. The filtered solution was casted on a glass plate to prepare a polymer separator, and the polymer separator was dried for 12 hours in a 80° C. oven, and then dried for 12 hours at 80° C. in a vacuum oven.

The prepared polymer separator was placed in distilled water and separated, then kept while being immersed in a 1 M hydrochloric acid (HCl) solution for 24 hours at room temperature, repeatedly washed with distilled water, and then kept for 24 hours while being immersed in distilled water.

Subsequently, the polymer separator was taken out of the distilled water, and dried for 12 hours in a 80° C. vacuum oven to prepare a polymer separator. The prepared polymer separator had a brown transparent film form.

In addition, a film-type polymer separator was prepared in the same manner from each of the block polymers prepared in Examples 3 and 4.

Ion exchange capacity (IEC) of the prepared film was obtained through an area ratio using $^1$H-NMR spectroscopy, and cation conductivity was measured while varying a humidity condition. The results are shown in the following Table 1.

Comparative Example

Using Nafion 211 (DuPont), cation conductivity and ion exchange capacity (IEC) were measured as in Experimental Example 1, and the results are shown in the following Table 1.

In the following Table 1, Cation Conductivity 1 was measured under relative humidity (RH) of 30% and 70° C., Cation Conductivity 2 under relative humidity (RH) of 50% and 70° C., Cation Conductivity 3 under relative humidity (RH) of 80% and 70° C., and Cation Conductivity 4 under relative humidity (RH) of 100% and 70° C. using the above-described method.

TABLE 1

| Polymer | IEC (meq/g) | Cation Conductivity 1 (mS/cm) @ RH 30%, 70° C. | Cation Conductivity 2 (mS/cm) @ RH 50%, 70° C. | Cation Conductivity 3 (mS/cm) @ RH 80%, 70° C. | Cation Conductivity 4 (mS/cm) @ RH 100%, 70° C. |
| --- | --- | --- | --- | --- | --- |
| Example 1 | 1.09 | 2.41 | 9.97 | 42.66 | 189.27 |
| Example 3 | 1.18 | 4.35 | 14.29 | 53.20 | 175.04 |
| Example 4 | 1.33 | 8.99 | 10.35 | 39.84 | 181.44 |
| Comparative Example | 0.92 | 12.20 | 27.97 | 83.82 | 162.28 |

FIG. 4 is a graph presenting cation conductivity values according to Examples 1, 3 and 4, and Comparative Example.

From the results of Table 1, it was identified that cation conductivity was excellent under a high humidity condition (relative humidity of approximately 100% or greater) when using a block polymer including a hydrophilic block and a hydrophobic block according to Experimental Example 1, compared to when using Nafion used as an existing separator material.

Specifically, in the polymer separator according to the experimental example, high ion conductivity of the polymer separator may be achieved by the hydrophilic block including perfluorosulfonic acid, and water uptake of the polymer separator decreases and mechanical stability of the membrane increases under a humidity condition by the hydrophobic block including a large amount of fluorine functional groups.

Experimental Example 2

A film-type polymer separator was prepared in the same manner as in Experimental Example 1 from each of the polymers of Examples 1, 3 and 4.

After keeping the prepared film for 24 hours while being immersed in distilled water, water uptake was measured from changes in the weight of the film, and a swelling ratio was measured from changes in the width (x), the height (y) and the thickness (z) of the film. The results are described in the following Table 2.

From the results of Table 2, it was identified that, when using a block polymer including a hydrophilic block and a hydrophobic block according to Examples 1, 3 and 4, water uptake and swelling ratio were maintained at a low degree despite an increase in the hydrophilic block content.

Hereinbefore, preferred examples of the present disclosure have been described, however, the present disclosure is not limited thereto, and various modification may be made within the scope of the claims and the detailed descriptions of the disclosure, and these also fall within the category of the disclosure.

REFERENCE NUMERAL

100: Separator
200a: Anode
200b: Cathode
10: Positive Electrode Tank
20: Negative Electrode Tank
11, 21: Pump
31: Separator
32: Positive Electrode Cell
33: Negative Electrode Cell
41: Positive Electrode Electrolyte liquid
42: Negative Electrode Electrolyte liquid
60: Stack
70: Oxidizer Supply Unit
80: Fuel Supply Unit
81: Fuel Tank
82: Pump

TABLE 2

| Polymer | Weight (g) Dry | Weight (g) Wet | Width (x) Length (cm) Dry | Width (x) Length (cm) Wet | Height (y) Length (cm) Dry | Height (y) Length (cm) Dry | Thickness (z) (μm) Dry | Thickness (z) (μm) Wet | Water Uptake (%) | Swelling Ratio (%) | |
| --- | --- | --- | --- | --- | --- | --- | --- | --- | --- | --- | --- |
| Example 1 (z1:y1 = 0.6:0.4) | 0.1109 | 0.1233 | 2.9 | 3.1 | 2.9 | 3.1 | 84 | 88 | 11.18 | Lx | 6.9 |
| | | | | | | | | | | Ly | 6.9 |
| | | | | | | | | | | Lz | 4.8 |
| Example 3 (z1:y1 = 0.7:0.3) | 0.1299 | 0.1416 | 2.9 | 3.0 | 2.9 | 3.0 | 102 | 108 | 9.00 | Lx | 3.4 |
| | | | | | | | | | | Ly | 3.4 |
| | | | | | | | | | | Lz | 5.9 |
| Example 4 (z1:y1 = 0.8:0.2) | 0.0780 | 0.0913 | 2.9 | 3.1 | 2.85 | 3.1 | 60 | 63 | 17.05 | Lx | 6.9 |
| | | | | | | | | | | Ly | 8.8 |
| | | | | | | | | | | Lz | 5 |
| Comparative Example | 0.0650 | 0.0788 | 3.0 | 3.29 | 3.0 | 3.31 | 3.0 | 3.30 | 21.20 | Lx | 9.6 |
| | | | | | | | | | | Ly | 10.4 |
| | | | | | | | | | | Lz | 10.1 |

The invention claimed is:

1. A polymer comprising:

a hydrophilic block; and a hydrophobic block, wherein the hydrophilic block includes a repeating unit represented by the following Chemical Formula 4-1; and the hydrophobic block includes a repeating unit represented by the following Chemical Formula 5-1:

[Chemical Formula 4-1]

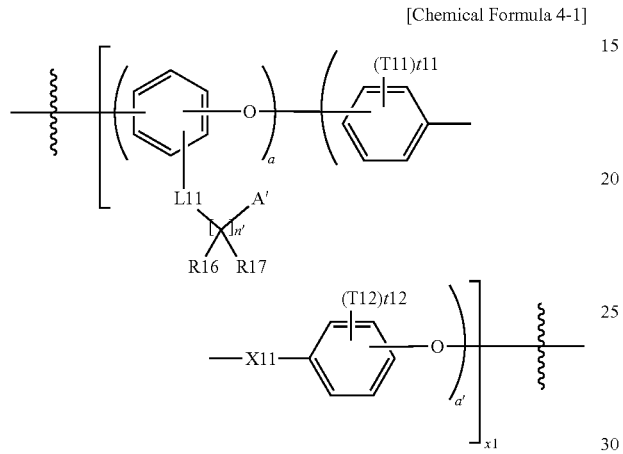

[Chemical Formula 5-1]

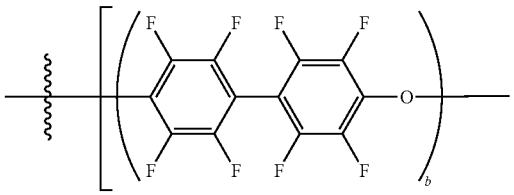

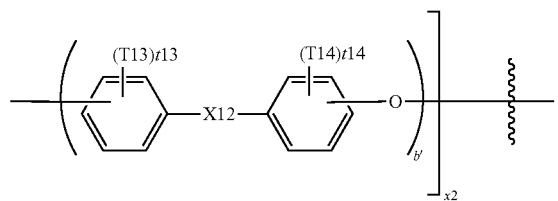

in Chemical Formula 4-1 and Chemical Formula 5-1 x1, a and a' are, as a repetition number of units in the parentheses, an integer of 1 to 1,000, and a:a' is from 1,000:1 to 1:1,000;

L11 is —S—;

A' is —O(CF$_2$)$_m$SO$_3$H, or —O(CF$_2$)$_m$SO$_3^-$M$^+$;

m is an integer of 2 to 6, and M is a group 1 element;

R16 and R17 are the same as or different from each other, and each independently is a halogen group;

n' is an integer of 2 to 10, and when n' is an integer of 2 or greater, structures in the parentheses are the same as or different from each other;

X11 is a direct bond; —C(Z11)(Z12)-; —O—; —S—; —SO2-; —CO—; or —Si(Z11)(Z12)-,

Z11 and Z12 are the same as or different from each other, and each independently is hydrogen; deuterium; a halogen group; a substituted or unsubstituted alkyl group; or a substituted or unsubstituted aryl group; and T11 and T12 are the same as or different from each other, and each independently is hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted amine group; a substituted or unsubstituted aryl group; or a substituted or unsubstituted heteroaryl group, t11 and t12 are an integer of 0 to 4, and when t11 and t12 are an integer of 2 or greater, substituents in the parentheses are the same as or different from each other; and x2, b and b' are, as a repetition number of units in the parentheses, an integer of 1 to 1,000, and b:b' is from 1,000:1 to 1:1,000;

X12 is a direct bond; —C(Z13)(Z14)-; —O—; —S—; —SO2-; —CO—; or —Si(Z13)(Z14)-;

Z13 and Z14 are the same as or different from each other, and each independently hydrogen; deuterium; a halogen group; a substituted or unsubstituted alkyl group; or a substituted or unsubstituted aryl group;

T13 and T14 are the same as or different from each other, and each independently hydrogen; deuterium; a halogen group; a nitrile group; a nitro group; a hydroxyl group; a substituted or unsubstituted alkyl group; a substituted or unsubstituted cycloalkyl group; a substituted or unsubstituted alkoxy group; a substituted or unsubstituted alkenyl group; a substituted or unsubstituted silyl group; a substituted or unsubstituted amine group; a substituted or unsubstituted aryl group; or a substituted or unsubstituted heteroaryl group, t13 and t14 are an integer of 0 to 4, and when t13 and t14 are an integer of 2 or greater, substituents in the parentheses are the same as or different from each other, however, X12 is —C(Z13)(Z14)-; or —Si(Z13)(Z14)-, and Z13 and Z14 are the same as or different from each other and each independently an alkyl group substituted with a halogen group, or X12 is a direct bond; —C(Z13)(Z14)-; —O—; —S—; —SO2-; —CO—; or —Si(Z13)(Z14)-, and when Z13 and Z14 are not an alkyl group substituted with a halogen group, T13 and T14 are the same as or different from each other and each independently a halogen group; an alkyl group substituted with a halogen group; or an aryl group substituted with a halogen group, and t13 and t14 are an integer of 1 to 4.

2. The polymer of claim 1, wherein A is —O(CF$_2$)$_m$SO$_3$H.

3. The polymer of claim 1, wherein A is —O(CF$_2$)$_m$SO$_3^-$M$^+$, m is an integer of 2 to 6, and M is a group 1 element.

4. The polymer of claim 1, wherein R16 and R17 are F.

5. The polymer of claim 1, which is a block polymer.

6. The polymer of claim 1, further comprising:
a brancher derived from a compound of the following Chemical Formula 6; or
a brancher represented by the following Chemical Formula 7:

Q1—（X）$_l$—Q2  [Chemical Formula 6]

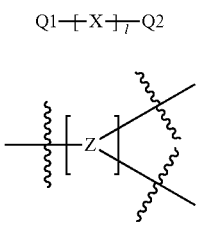

[Chemical Formula 7]

wherein
X is S; O; CO; SO; $SO_2$; NR; a hydrocarbon-based moiety; or a fluorine-based moiety;
l is an integer of 0 to 100, and when l is 2 or greater, two or more Xs are the same as or different from each other;
Q1 and Q2 are the same as or different from each other, and each independently is an aromatic ring in which one, two or more are substituted with substituents selected from the group consisting of a hydroxyl group and a halogen group; an aliphatic ring in which one, two or more are substituted with substituents selected from the group consisting of a hydroxyl group and a halogen group; or an amine group represented by NR'R";
R, R' and R" are an aromatic ring substituted with a halogen group; or an aliphatic ring substituted with a halogen group; and
Z is a trivalent organic group.

7. A polymer separator comprising the polymer of claim 1.

8. The polymer separator of claim 7, which has ion conductivity of 0.005 S/cm to 0.8 S/cm.

9. The polymer separator of claim 7, which has ion exchange capacity (IEC) of 0.01 mmol/g to 5 mmol/g.

10. A membrane electrode assembly comprising:
an anode;
a cathode; and
the polymer separator of claim 7 provided between the anode and the cathode.

11. A polymer electrolyte fuel cell comprising:
two or more of the membrane electrode assemblies of claim 10;
a stack comprising a bipolar plate provided between the membrane electrode assemblies;
a fuel supply unit supplying a fuel to the stack; and
an oxidizer supply unit supplying an oxidizer to the stack.

12. A redox flow battery comprising:
a positive electrode cell comprising a positive electrode and a positive electrode electrolyte liquid;
a negative electrode cell comprising a negative electrode and a negative electrode electrolyte liquid; and
the polymer separator of claim 7 provided between the positive electrode cell and the negative electrode cell.

* * * * *